US011188570B2

(12) United States Patent
Jain et al.

(10) Patent No.: US 11,188,570 B2
(45) Date of Patent: Nov. 30, 2021

(54) USING KEYS TO AGGREGATE FLOW ATTRIBUTES AT HOST

(71) Applicant: VMware, Inc., Palo Alto, CA (US)

(72) Inventors: Jayant Jain, Cupertino, CA (US); Russell Lu, Pleasanton, CA (US); Ly Loi, Los Altos, CA (US); Rick Lund, Livermore, CA (US); Sushruth Gopal, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 112 days.

(21) Appl. No.: 16/520,224

(22) Filed: Jul. 23, 2019

(65) Prior Publication Data

US 2021/0026870 A1 Jan. 28, 2021

(51) Int. Cl.
*G06F 17/00* (2019.01)
*G06F 16/28* (2019.01)
*G06N 20/00* (2019.01)
*G06N 5/04* (2006.01)
*G06F 16/2455* (2019.01)
*G06F 9/455* (2018.01)
*G06F 21/55* (2013.01)

(52) U.S. Cl.
CPC ...... *G06F 16/285* (2019.01); *G06F 16/24556* (2019.01); *G06N 5/04* (2013.01); *G06N 20/00* (2019.01); *G06F 9/45541* (2013.01); *G06F 21/552* (2013.01); *G06F 2221/034* (2013.01)

(58) Field of Classification Search
CPC ............ G06F 16/285; G06F 16/24556; G06F 2221/034; G06F 9/45541; G06F 21/552; G06N 20/00; G06N 5/04; H04L 63/1408; H04L 43/00
See application file for complete search history.

(56) References Cited

U.S. PATENT DOCUMENTS 5,636,128 A 6/1997 Sugimoto et al.
7,027,411 B1 4/2006 Pulsipher et al.
(Continued)

OTHER PUBLICATIONS

Lucas Waye et al, Cryptographically Secure Information Flow Control on Key-Value Stores. In Proceedings of the 2017 ACM SIGSAC Conference on Computer and Communications Security (CCS '17). Association for Computing Machinery, pp. 1893-1907, November (Year: 2017).*

(Continued)

*Primary Examiner* — Greta L Robinson
(74) *Attorney, Agent, or Firm* — Adeli LLP

(57) ABSTRACT

Some embodiments provide a novel method for collecting and reporting attributes of data flows associated with machines executing on a plurality of host computers to an analysis appliance. Each host computer, in some embodiments, is responsible for collecting and reporting attributes of data flows associated with machines executing on a host computer. The host computer, in some embodiments, first eliminates duplicative flow group records and then aggregates the flow data according to a set of received keys that specify attributes that define the aggregation. For example, a simple key that specifies a set of machine identifiers (e.g., a VM ID) as attribute values will, for each machine identifier, aggregate all flows with that machine identifier into a single aggregated flow group record. In some embodiments, the host computer includes a flow exporter that processes and publishes flow data to the analysis appliance.

19 Claims, 26 Drawing Sheets

(56) References Cited

U.S. PATENT DOCUMENTS

| | | |
|---|---|---|
| 7,065,079 B1 | 6/2006 | Patra et al. |
| 7,739,211 B2 | 6/2010 | Coffman et al. |
| 8,005,945 B2* | 8/2011 | Cohen .................. H04L 47/10 709/224 |
| 8,359,652 B2 | 1/2013 | Bhagwan et al. |
| 8,495,429 B2 | 7/2013 | Fu et al. |
| 8,605,655 B1 | 12/2013 | Sahai et al. |
| 9,215,213 B2 | 12/2015 | Bansal et al. |
| 9,218,527 B2 | 12/2015 | Lakshminarayan et al. |
| 9,223,767 B1 | 12/2015 | Powell et al. |
| 9,438,560 B2 | 9/2016 | Mohanty et al. |
| 9,438,634 B1 | 9/2016 | Ross et al. |
| 9,454,444 B1 | 9/2016 | Agarwal et al. |
| 9,467,476 B1 | 10/2016 | Shieh et al. |
| 9,497,206 B2 | 11/2016 | Bernstein et al. |
| 9,578,050 B1 | 2/2017 | Barabash et al. |
| 9,680,877 B2 | 6/2017 | Duffield et al. |
| 9,699,049 B2 | 7/2017 | Gupta et al. |
| 9,787,641 B2 | 10/2017 | Bansal et al. |
| 9,891,940 B2 | 2/2018 | Feroz et al. |
| 9,998,339 B1 | 6/2018 | Brajkovic et al. |
| 10,298,619 B2 | 5/2019 | Nimmagadda et al. |
| 10,324,746 B2 | 6/2019 | Kumar et al. |
| 10,419,321 B2 | 9/2019 | Raman et al. |
| 10,432,707 B2 | 10/2019 | Hosie et al. |
| 10,812,409 B2 | 10/2020 | Tiwary et al. |
| 10,911,335 B1 | 2/2021 | Mordani et al. |
| 2003/0120955 A1 | 6/2003 | Bartal et al. |
| 2003/0236677 A1 | 12/2003 | Casati et al. |
| 2005/0262554 A1 | 11/2005 | Brooks et al. |
| 2005/0289219 A1 | 12/2005 | Nazzal |
| 2006/0085785 A1 | 4/2006 | Garrett |
| 2006/0239203 A1 | 10/2006 | Talpade et al. |
| 2007/0011734 A1 | 1/2007 | Balakrishnan et al. |
| 2007/0058632 A1 | 3/2007 | Back et al. |
| 2008/0037423 A1 | 2/2008 | Singh et al. |
| 2008/0059596 A1 | 3/2008 | Ogawa |
| 2008/0196102 A1 | 8/2008 | Roesch |
| 2008/0196103 A1* | 8/2008 | Lin .................. H04L 63/1416 726/24 |
| 2008/0267186 A1 | 10/2008 | Boukis et al. |
| 2008/0281660 A1* | 11/2008 | Sajja ................ G06Q 10/06316 705/7.26 |
| 2008/0282335 A1 | 11/2008 | Abzarian et al. |
| 2009/0106228 A1 | 4/2009 | Weinman, Jr. |
| 2009/0300341 A1 | 12/2009 | Buehler et al. |
| 2010/0049968 A1 | 2/2010 | Dimitrakos et al. |
| 2010/0106764 A1 | 4/2010 | Chadwick et al. |
| 2010/0107085 A1 | 4/2010 | Chadwick et al. |
| 2010/0153316 A1 | 6/2010 | Duffield et al. |
| 2010/0211673 A1 | 8/2010 | Kosbab et al. |
| 2010/0309812 A1 | 12/2010 | Marquez et al. |
| 2010/0325199 A1 | 12/2010 | Park et al. |
| 2010/0332262 A1 | 12/2010 | Horvitz et al. |
| 2011/0082962 A1 | 4/2011 | Horovitz et al. |
| 2011/0170413 A1 | 7/2011 | Shi et al. |
| 2012/0131591 A1 | 5/2012 | Moorthi et al. |
| 2012/0226808 A1 | 9/2012 | Morgan |
| 2013/0041522 A1 | 2/2013 | Mori et al. |
| 2013/0067090 A1 | 3/2013 | Batrouni et al. |
| 2013/0185413 A1 | 7/2013 | Beaty et al. |
| 2013/0198459 A1 | 8/2013 | Joshi et al. |
| 2013/0212255 A1 | 8/2013 | Chao et al. |
| 2014/0019964 A1 | 1/2014 | Neuse et al. |
| 2014/0207918 A1 | 7/2014 | Kowalski et al. |
| 2014/0230008 A1 | 8/2014 | Feroz et al. |
| 2014/0282591 A1 | 9/2014 | Stich et al. |
| 2015/0113529 A1 | 4/2015 | Zhong |
| 2015/0124608 A1 | 5/2015 | Agarwal et al. |
| 2015/0135003 A1 | 5/2015 | Cota-Robles et al. |
| 2015/0181394 A1 | 6/2015 | Zuniga et al. |
| 2015/0286783 A1 | 10/2015 | Kumar et al. |
| 2015/0304349 A1 | 10/2015 | Bernstein et al. |
| 2015/0358391 A1 | 12/2015 | Moon et al. |
| 2016/0050589 A1 | 2/2016 | Safavi |
| 2016/0080404 A1* | 3/2016 | Kohout .............. H04L 63/1425 726/23 |
| 2016/0087859 A1 | 3/2016 | Kuan et al. |
| 2016/0156591 A1 | 6/2016 | Zhou et al. |
| 2016/0191413 A1 | 6/2016 | Feroz et al. |
| 2016/0191463 A1 | 6/2016 | Mohanty et al. |
| 2016/0191521 A1 | 6/2016 | Feroz et al. |
| 2016/0216994 A1 | 7/2016 | Sefidcon et al. |
| 2016/0218951 A1 | 7/2016 | Masseur et al. |
| 2016/0294987 A1 | 10/2016 | Tian et al. |
| 2016/0350683 A1 | 12/2016 | Bester et al. |
| 2016/0359759 A1 | 12/2016 | Singh et al. |
| 2016/0380812 A1 | 12/2016 | Chanda et al. |
| 2016/0380884 A1 | 12/2016 | Sarikaya et al. |
| 2017/0005986 A1 | 1/2017 | Bansal et al. |
| 2017/0078168 A1 | 3/2017 | Harris et al. |
| 2017/0126677 A1 | 5/2017 | Kumar et al. |
| 2017/0134247 A1 | 5/2017 | Hoja et al. |
| 2017/0207968 A1 | 7/2017 | Eicken et al. |
| 2017/0212799 A1 | 7/2017 | Konireddygari |
| 2017/0214634 A1 | 7/2017 | Li |
| 2017/0293994 A1 | 10/2017 | Li et al. |
| 2017/0324632 A1 | 11/2017 | Arora |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007127 A1 | 1/2018 | Salapura et al. |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0048623 A1 | 2/2018 | Bansal et al. |
| 2018/0077119 A1 | 3/2018 | Fields et al. |
| 2018/0077189 A1 | 3/2018 | Doppke et al. |
| 2018/0084034 A1 | 3/2018 | Netto et al. |
| 2018/0088964 A1 | 3/2018 | Hussain et al. |
| 2018/0101371 A1 | 4/2018 | Flanakin et al. |
| 2018/0123907 A1 | 5/2018 | Raman et al. |
| 2018/0123939 A1 | 5/2018 | Raman et al. |
| 2018/0145999 A1 | 5/2018 | Ertugrul et al. |
| 2018/0167405 A1 | 6/2018 | Comay et al. |
| 2018/0176102 A1 | 6/2018 | Bansal et al. |
| 2018/0176252 A1 | 6/2018 | Nimmagadda et al. |
| 2018/0176261 A1 | 6/2018 | Bansal et al. |
| 2018/0287876 A1 | 10/2018 | Strobel et al. |
| 2018/0288063 A1* | 10/2018 | Koottayi .............. H04L 63/102 |
| 2018/0324199 A1 | 11/2018 | Crotinger et al. |
| 2019/0171474 A1 | 6/2019 | Malboubi et al. |
| 2019/0180141 A1 | 6/2019 | Tiagi et al. |
| 2019/0182276 A1 | 6/2019 | Tiagi et al. |
| 2019/0182281 A1 | 6/2019 | Neil et al. |
| 2019/0199599 A1 | 6/2019 | Zavesky et al. |
| 2019/0266004 A1 | 8/2019 | Kumar et al. |
| 2019/0280949 A1 | 9/2019 | Wang et al. |
| 2019/0342335 A1 | 11/2019 | Ni et al. |
| 2019/0373052 A1 | 12/2019 | Pollitt et al. |
| 2019/0379612 A1 | 12/2019 | Tiwary et al. |
| 2020/0028756 A1 | 1/2020 | Hale et al. |
| 2020/0183947 A1 | 6/2020 | Reeve et al. |
| 2020/0310884 A1 | 10/2020 | Villalobos et al. |
| 2021/0026677 A1 | 1/2021 | Krishna et al. |
| 2021/0026720 A1 | 1/2021 | Jain et al. |
| 2021/0026830 A1 | 1/2021 | Jain et al. |
| 2021/0026863 A1 | 1/2021 | Mordani et al. |
| 2021/0028996 A1 | 1/2021 | Mordani et al. |
| 2021/0029002 A1 | 1/2021 | Mordani et al. |
| 2021/0029050 A1 | 1/2021 | Jain et al. |
| 2021/0029051 A1 | 1/2021 | Mordani et al. |
| 2021/0029166 A1 | 1/2021 | Krishna et al. |

OTHER PUBLICATIONS

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

Non-Published commonly owned U.S. Appl. No. 16/520,220, filed Jul. 23, 2019, 87 pages, VMware, Inc.

Non-Published commonly owned U.S. Appl. No. 16/520,227, filed Jul. 23, 2019, 88 pages, VMware, Inc.
Non-Published commonly owned U.S. Appl. No. 16/520,232, filed Jul. 23, 2019, 87 pages, VMware, Inc.
Non-Published commonly owned U.S. Appl. No. 16/520,233, filed Jul. 23, 2019, 87 pages, VMware, Inc.
Non-Published commonly owned U.S. Appl. No. 16/520,235, filed Jul. 23, 2019, 88 pages, VMware, Inc.
Non-Published commonly owned U.S. Appl. No. 16/520,238, filed Jul. 23, 2019, 88 pages, VMware, Inc.
Non-Published commonly owned U.S. Appl. No. 16/520,239, filed Jul. 23, 2019, 87 pages, VMware, Inc.
Non-Published commonly owned U.S. Appl. No. 16/554,370, filed Aug. 28, 2019, 96 pages, VMware, Inc.
Non-Published commonly owned U.S. Appl. No. 16/554,414, filed Aug. 28, 2019, 96 pages, VMware, Inc.
Turcotte, Melissa J. M., et al., "Unified Host and Network Data Set", Aug. 24, 2017, 16 pages, arXiv:1708.07518v1, arXiv.org, Cornell University, Ithaca, NY, USA.

* cited by examiner

*Figure 20*

USING KEYS TO AGGREGATE FLOW ATTRIBUTES AT HOST

BACKGROUND

Software defined data centers (SDDCs) in theory provide large amounts of data that can be used for many different applications. However, in practice, the data is fragmented and difficult for users to analyze. A solution is required to provide an infrastructure for providing a platform that can be accessed to perform analytics and to visualize the security posture of a SDDC.

BRIEF SUMMARY

Some embodiments provide a novel method for collecting and reporting attributes of data flows associated with machines executing on a plurality of host computers. In some embodiments, the machines are associated with a logical network implemented by a virtualization manager (e.g., VMware™ NSX manager). The logical network, in some embodiments, is implemented as an overlay network over a physical network and uses managed forwarding elements executing on host computers associated with the logical network. The collected data is reported to a policy, analytics, and correlation engine appliance (an analysis appliance). The analysis appliance is a server (or cluster of servers) that receives reports from each host computer and configuration data from a network manager computer, processes the data to be stored in a time series data storage, and performs analysis on the stored data. In some embodiments, the analysis appliance also provides access to the stored data to additional elements of the system for visualization and alternative analysis.

Each host computer, in some embodiments, is responsible for collecting and reporting attributes of data flows associated with machines executing on a host computer. In some embodiments, the host computer includes: a flow exporter that processes and publishes flow data to the analysis appliance, a set of guest introspection (GI) agents for collecting context data relating to the flows from machines (e.g., data compute nodes [DCNs], virtual machines, containers, etc.) executing on the host, a set of third-party programs or processes that provide additional context data, an anomaly detection engine and a machine learning engine that analyze flow data and context data and provide additional context data, and a context exporter for processing and publishing context data to the analysis appliance. In some embodiments, the flow data and context data from the context exporter and flow exporter are processed before publishing to generate a single set of aggregated data that is published to the analysis appliance.

The flow exporter of some embodiments includes: a flow identifier/statistics collector, a flow identifier and statistics storage, a flow aggregator timer, a flow collector, a first-in first-out (FIFO) storage, a configuration data storage, a flow aggregator, a flow group record storage, a flow publisher timer, and a flow group record publisher for collecting and processing flow data and publishing the processed flow data as a set of flow group records to an analysis appliance. The flow identifier/statistics collector receives flow information, including flow identifiers and statistics, which is then stored according to flow identifiers in a flow identifier and statistics storage. The flow collector, in some embodiments, is responsible for collecting flow data from the flow identifier and statistics storage (e.g., as flows become inactive [terminate] or at the end of an aggregation/publishing period). After being collected by a flow collector, some embodiments, place the collected flow data into the FIFO storage. In some embodiments, the data is correlated with configuration data before being placed in the FIFO storage. From the FIFO storage, some embodiments, pull the flow data into the flow aggregator.

The flow aggregator, in some embodiments, first eliminates duplicative flow group records and then aggregates the flow data according to a set of received keys that specify attributes that define the aggregation. For example, a simple key that specifies a set of machine identifiers (e.g., a VM ID) as attribute values will, for each machine identifier, aggregate all flows with that machine identifier into a single aggregated flow group record. In some embodiments, the attributes specified in a key are any or all of: (1) attributes to generate key values for, (2) attributes to aggregate, and (3) attributes to ignore. In some embodiments, the keys also specify attribute values for which an entire set of flow data can be dropped and not aggregated (e.g., any flow that does not use one of a set of protocols [e.g., TCP, UDP, ESP, GRE, and SCTP], or is a broadcast or multicast flow is not processed). Other keys may specify ranges of values for which data is aggregated. Other keys, in some embodiments, specify attribute values that are not aggregated (e.g., source port).

In some embodiments, the key specifies a set of attributes and the aggregation engine identifies unique sets of values for the specified set of attributes in the flow data received from the FIFO storage and generates a separate record for each unique set of values (e.g., unique four-tuple including source IP address, destination IP address, destination port, and protocol). For each record generated by the aggregation engine, attributes of flows matching the key values are aggregated in a manner that can be configured by a user. For example, certain attributes have attribute values from the individual flow data concatenated, other attributes may be aggregated to include only unique values in the individual flow data, while further attributes (e.g., URLs) may be converted into a hash before being aggregated as described above. Aggregated flow group records are stored in the flow group record storage and at the end of an aggregation/publishing period are published to the analysis appliance and deleted to reuse the storage for flow group records of subsequent aggregation periods. In some embodiments, a second deduplicating process is performed to consolidate flow group records for two sets of unidirectional flows that together make up a single flow between two machines executing on the host.

The context exporter includes a context engine that, in some embodiments, collects context data from multiple sources, provides portions of the collected context data to other modules on the host computer, and correlates the context data for publishing to the analysis appliance (e.g., through the context publisher on the host). Guest introspection (GI) agents executing on the machines, in some embodiments, provide a rich set of context data including data regarding guest metadata (per machine), guest events, and guest machine metrics to the context agent. Some of the context data received from the GI agents (e.g. a security ID [SID], a process hash, additional relevant metrics) is provided by the context engine to a set of service engines for making service decisions and is included in the flow data processed by the flow exporter, in some embodiments. The context engine also receives, in some embodiments, context data from third-party sources (e.g., programs or processes). In some embodiments, the context engine provides context data to the anomaly engine and receives context data from the anomaly engine as will be described below. Context data, in some embodiments, is also provided by a threat detection/deep packet inspection (DPI) module on the host. At the end of an independently configurable collection period, the context engine provides collected contextual attribute data to the context publisher for publishing to the analysis appliance. After publishing the contextual attribute data and, in some embodiments, receiving confirmation of receipt by the analysis appliance, the stored records are deleted to clear up storage for records for the next publishing period. In some embodiments, the context data and flow group records produced by the flow exporter are aggregated before being published to the analysis appliance.

The anomaly detection engine, in some embodiments, receives sets of flow and context data to perform anomaly detection. In some embodiments, anomaly detection is based on the context data from the guest introspection agent and deep packet inspection. By receiving more context data (e.g., a user ID, a process ID, a DCN ID, and other information not found in L2-L7 headers), the anomaly detection engine is able to detect anomalies that are not able to be detected by looking at a flow tuple by itself. The anomaly detection engine, in some embodiments, is a stateless engine that looks at the set of data related to a particular flow to determine that the flow indicates anomalous behavior. In other embodiments, the anomaly detection engine is a stateful engine that maintains state information for a plurality of flows (or flow templates) that is used to determine that the flow and context data indicate anomalous behavior. In still other embodiments, the anomaly detection engine does both stateful and stateless analysis to determine if the flow and context data indicate anomalous behavior. The anomaly detection engine provides additional context data indicating whether anomalous behavior was detected and, in some embodiments, an identifier that identifies a specific anomalous behavior or type of anomalous behavior detected.

Some embodiments provide an analysis appliance that receives the collected data (e.g., as separate flow group records and contextual attribute data) from the host computers as well as from a network manager computer. The analysis appliance, in some embodiments, is a server or cluster of servers that, based on the received data from each host computer and configuration data from the network manager computer, processes the data to be stored in a time series data storage, and performs analysis on the stored data. In some embodiments, the analysis appliance also provides access to the stored data to additional elements of the system for visualization and alternative analysis. The analysis appliance, in some embodiments, provides a set of interfaces for receiving data from the host computers and the network manager and for interacting with a user through a user interface, a processing pipeline for flow data (e.g., flow group records received from host computers), a set of data storages for storing received data, and a set of data analysis engines (e.g., any or all of a visualization engine, anomaly detection engine, recommendation generation engine, and machine-trained engine (network), etc.).

The analysis appliance, in some embodiments, receives definitions of keys and provides them to the host computers to be used as described above. In some embodiments, existing keys are modified based on the analysis that is described below. Additionally, or alternatively, new keys are provided based on the analysis. As described above, the analysis appliance receives the flow group records (e.g., sets of attributes) based on the keys and the configuration data from each host computer. The analysis appliance, in some embodiments, also receives configuration data from the network manager computer (or set of computers).

After receiving the flow group records, the analysis appliance processes the received flows through a set of processing operations to reduce the amount of data that needs to be retained and to make the data more useful. In some embodiments, a first set of processing operations includes a first type of deduplication/aggregation operation for finding first sets of corresponding flow group records received from different host computers and aggregating (or merging) them. The first set of corresponding flow group records, in some embodiments, includes flow group records based on a same set of data messages (e.g., with a same set of flow identifiers) sent from a first host computer and received at a second host computer.

A second set of processes, in some embodiments, includes a second type of deduplication/aggregation operation for finding flow group records for a second set of corresponding flow group records and aggregating (or merging) them. The second set of corresponding flow group records, in some embodiments, includes flow group records based on data messages being sent in opposite directions (e.g., having source and destination identifiers flipped relative to each other), but that are part of a same flow (e.g., a single communication session having a common set of flow headers) sent between a first host computer and a second host computer. In some embodiments, the first and second aggregation operations serve to fill in information missing from a flow group record received from the first host machine with information present in a flow group record received from the second host machine or vice versa. For flow group records not having a corresponding flow group record that can be used for filling in missing information (e.g., flows that are blocked before exiting a source host computer that do not have destination machine information), a separate set of process operations is provided to fill in the missing information using learned IP address/machine identifier pairings based on previously processed flow group records.

Additional processing operations, in some embodiments, include a correlation with configuration data received from the network manager computer. In some embodiments, the correlation with the configuration data identifies a group associated with at least one of: (i) the source machine, (ii) destination machine, and (iii) service rules applied to the flows. The correlation with the configuration data, in some embodiments, also identifies whether a service rule applied to the flows is a default service rule. In some embodiments, the correlation with the configuration is based on a tag included in the flow group record that identifies a configuration version, and a configuration associated with the identified configuration version is used to identify the group association or the identity of the default service rule. Further processing operations include, in some embodiments, correlation operations to correlate the flow group record with contextual attribute data in the contextual attribute data sets received from the host computers.

After processing the received data sets through the different processing operations, in some embodiments, the processed data is stored in a time series data storage. The time series data storage, in some embodiments, is organized at a plurality of levels of temporal granularity. In some embodiments, the different levels of granularity include some combination of hourly, daily, weekly, and monthly. The different levels of temporal granularity are used, in some embodiments, for data collected for a previous 24 hours (e.g., organized on an hourly basis), data for a previous 6 days (e.g., organized on a daily basis), data for a previous 30 days (e.g., organized on a daily or weekly basis), and data received more than 30 days earlier (e.g., organized on a monthly basis). The data organized based on the various levels of temporal granularity are, in some embodiments, periodically (e.g., daily) rolled up into the next level of granularity. In some embodiments, different time series storages are used for each of the different sets of data received at the analysis appliance.

Once data is stored (e.g., in the time series data storage), some embodiments, provide data processing and analysis operations for visualization, anomaly detection, and recommendation generation. Some of the processing operations make use of machine learning to perform some analysis operations (e.g., anomaly detection and recommendation generation). The different processing and analysis operations, in some embodiments, are provided by a set of data processing engines (e.g., a visualization engine, an anomaly detection engine, a recommendation generation engine, etc.).

The anomaly detection engine, in some embodiments, analyzes the incoming flow data to detect anomalous behavior. The analysis, in some embodiments, is performed after a deduplication/aggregation operation. In some embodiments, the analysis identifies flows for further investigation by an administrator. The analysis, in some embodiments is also performed based on other received data sets (e.g., context data and configuration data), stored flow data, or both. In some embodiments, the configuration data is used to identify service rules in effect at the time the flows were collected. The analysis, in some embodiments, includes at least one of (i) identifying flows that appear to break service rules identified from the configuration data and (ii) identifying large amounts of data exchanged between two machines, and results in an alert to an administrator of the anomalous behavior.

In some embodiments, the incoming flow data includes an attribute indicating anomalous behavior related to the flow. The anomaly detection engine, in some embodiments, performs further analysis to detect anomalous behavior based on the indication received from the host computer. If anomalous behavior is detected, an indication of the anomalous behavior is provided for display on a user interface (e.g., a graphical user interface). In some embodiments, the indicator received from the host computer is a flag that merely indicates that some type of (potentially) anomalous behavior was detected, while in other embodiments, the indicator received from the host computer also indicates a type of anomalous behavior detected (e.g., mismatched port and application, allowing a formerly blocked flow, an insecure version of an application, etc.). The further analysis, in some embodiments, is based on the flow data and the stored flow data, and, in some embodiments, context and configuration data. The analysis engine, in some embodiments, provides data for machine learning and uses machine-trained networks to detect anomalous behavior.

Some embodiments also provide a recommendation engine to produce recommendations for an administrator. The recommendation engine, in some embodiments, provides data for machine learning and uses machine-trained networks to make recommendations. In some embodiments, the recommendations include a recommendation for a group to which a particular machine should be added or for a new group that should be created for a particular set of machines. In some embodiments, the recommendation engine identifies machines that have not undergone microsegmentation (are "unmicrosegmented") and suggests specific service rules for microsegmentation or makes a general recommendation that microsegmentation may be desirable to an administrator.

In some embodiments, the visualization processing includes identifying machines as members of groups and identifying machines that are connected (e.g., have had communications in a previous time period). The visualization processing, in some embodiments, also includes generating a graphical user interface that can be used to select groups of machines, domains, or individual machines and displays contextual attributes relevant to the selected group, domain, or machine. In some embodiments, the context data is displayed based on a mouse-over (e.g., hover) operation in which a mouse (e.g., pointer) is moved over a machine, domain, or group to select it for display of contextual attributes and a window appears over the previous graphical representation with the contextual attributes displayed in the window. In some embodiments, flows between machines are also presented visually and can be selected, or a mouse-over can be used, to display additional contextual attributes of a selected flow. Other display options (e.g., lists, tables, etc.) are used in addition to or in place of the described mouse over.

In some embodiments, the visualization engine generates different views of the elements of the network. The different views, in some embodiments, include a machine-based view of the network, a group-based view of the network, and a drill down to a machine-based view of a group. In some embodiments, different views are generated in different ways. For example, in some embodiments, a canvas format is used for generating displays of a view of an entire network, while a scalable vector graphics (SVG) format is used to generate displays of smaller sets of data. Some embodiments use a combination of canvas and SVG-based displays to generate some displays.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

FIG. 20 illustrates an embodiment of a user interface for generating and publishing service rule recommendations.

DETAILED DESCRIPTION

Figure 1:
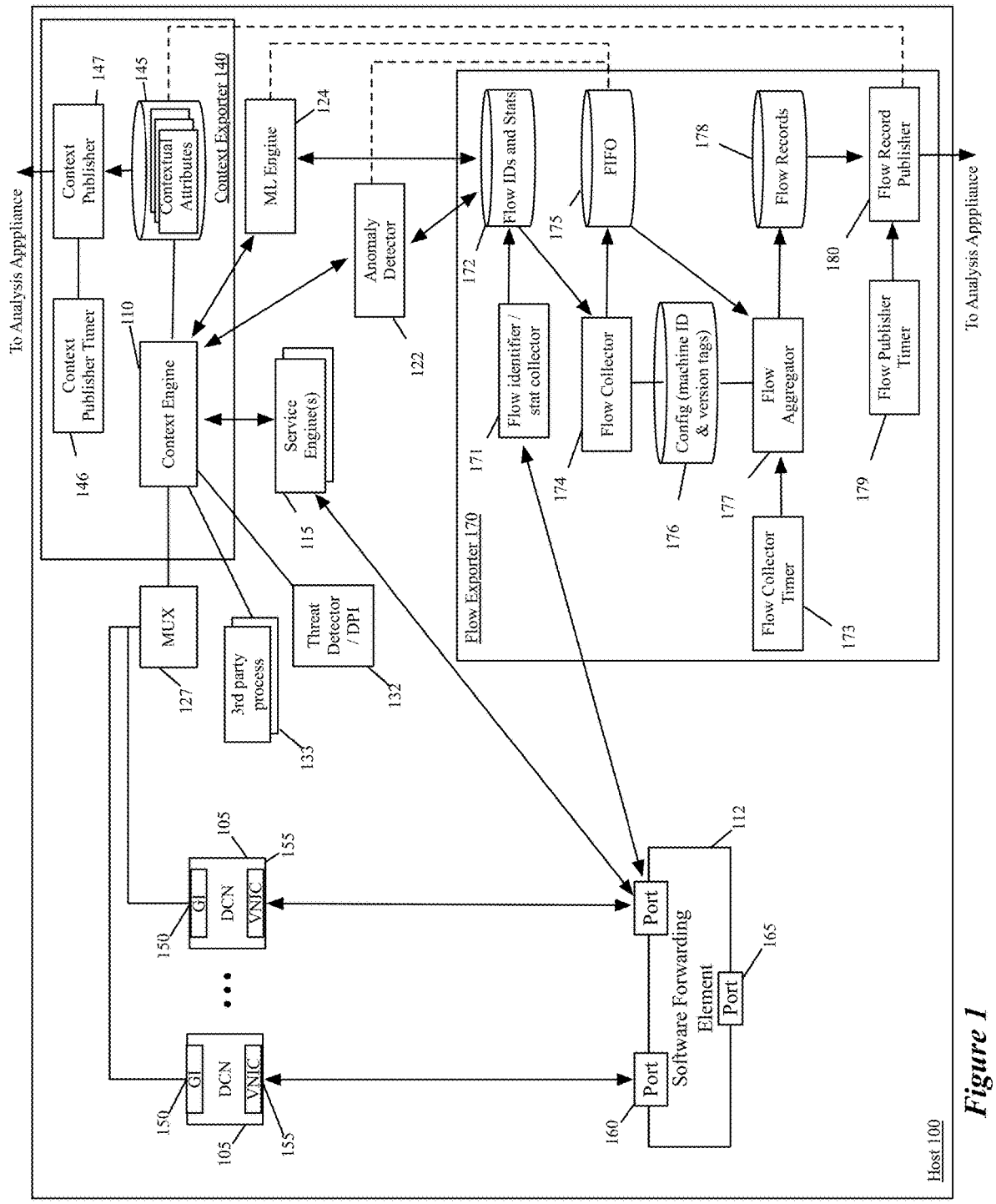
FIG. 1 illustrates a host computer that uses a context exporter and a flow exporter to collect, aggregate, and publish aggregated data to an analysis appliance.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for collecting and reporting attributes of data flows associated with machines executing on a plurality of host computers. In some embodiments, the machines are associated with a logical network implemented by a virtualization manager (e.g., VMware™ NSX manager). The logical network, in some embodiments, is implemented as an overlay network over a physical network and uses managed forwarding elements executing on host computers associated with the logical network. The collected data is reported to a policy, analytics, and correlation engine appliance (an analysis appliance). The analysis appliance is a server (or cluster of servers) that receives reports from each host computer and configuration data from a network manager computer, processes the data to be stored in a time series data storage, and performs analysis on the stored data. In some embodiments, the analysis appliance also provides access to the stored data to additional elements of the system for visualization and alternative analysis.

As used in this document, data messages refer to a collection of bits in a particular format sent across a network. Also, as used in this document, a data flow refers to a set of data messages sharing a set of attributes (e.g. a five-tuple) even if the shared set of attributes has source and destination values switched for different directions of communication (i.e., from a first machine to a second machine and from the second machine back to the first machine). Data flows (or flows) as used in this document, in some instances, refer to one half of a communication between two machines (i.e., a flow refers, in some cases, to the communication from one machine to another machine in one direction). One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references, respectively, to the second data link layer, the third network layer, the fourth transport layer, and the seventh application layer of the OSI (Open System Interconnection) layer model.

Each host computer, in some embodiments, is responsible for collecting and reporting attributes of data flows associated with machines executing on a host computer. In some embodiments, the host computer includes: a flow exporter that provides flow data to an analysis appliance, a set of guest introspection (GI) agents for collecting context data relating to the flows from machines (e.g., data compute nodes [DCNs], virtual machines, containers, etc.) executing on the host, a set of third-party programs that provide additional context data, an anomaly detection engine that analyzes flow data and context data and provides additional context data, a machine learning engine that analyzes flow data and context data to make recommendations or perform preliminary processing to offload some of the processing at an upstream analysis appliance, a context engine for correlating the different sets of context data, and a set of publishers that will communicate the context data and flow data to the appliance cluster for further processing.

FIG. 1 illustrates a host computer 100 that uses context exporter 140 and flow exporter 170 to collect, aggregate, and publish aggregated data to an analysis appliance. As shown, the host computer 100 includes: several data compute nodes (DCNs) 105, a set of guest introspection (GI) agents 150, a set of service engines 115, a threat detector/deep packet inspection (DPI) module 132, a set of third-party processes 133, a MUX (multiplexer) 127, and a context exporter 140 (including a context engine 110, a contextual attribute storage 145, a context publisher timer 146, and a context publisher 147) for processing context data (e.g., contextual attribute data sets) at host computer 100 and publishing the context data to an analysis appliance. Flow exporter 170, in some embodiments, includes flow identifier/statistics collector 171, flow identifier and statistics storage 172, flow collector timer 173, flow collector 174, first-in first-out (FIFO) storage 175, configuration data storage 176, flow aggregator 177, flow group record storage 178, flow publisher timer 179, and flow group record publisher 180 for collecting and processing flow data and publishing the processed flow data as a set of flow group records to an analysis appliance. Host computer 100, in some embodiments, also includes anomaly detector 122 and machine learning (ML) engine 124 that performs preliminary analysis based on the context data and flow data received from the flow exporter 170 (e.g., the flow identifiers and statistics stored in storage 172).

The guest introspection agents 150 execute on the DCNs 105 and extract context data from the DCNs 105. For example, a guest introspection agent 150, in some embodiments, detects that a new data flow has been initiated (e.g., by sending a SYN packet in a data flow using TCP) and collects introspection data (e.g., a set of attributes of the data flow and DCN). The introspection data, in some embodiments, includes any, or all, of data regarding (i) guest metadata, (ii) guest events, and (iii) guest DCN metrics. In some embodiments, the guest metadata includes any, or all, of data regarding DCN 105 (a universally unique identifier [uuid], a bios uuid and a vmxpath), operating system data (type of OS and version information), and process data (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN 105 events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. One of ordinary skill in the art will appreciate that much of the context data, in some embodiments, is not included in L2-L7 headers of a flow and that many additional pieces of information may be collected by guest introspection agent 150. The partial list above serves only as an example of the types of information that can be gathered by guest introspection agent 150.

The collected context information is sent, in some embodiments, to context engine 110 through MUX 127 to be provided to other elements of the host and for correlation with context data received from other sources. In some embodiments, the other sources include a set of service engines 115, threat detector/DPI module 132, third-party software (processes) 133, anomaly detector 122, and ML engine 124. Context engine 110, in some embodiments, correlates the context data from the multiple sources for providing the correlated context data (e.g., sets of correlated contextual attributes) to the context publisher 147 (e.g., through context attribute storage 145). Additional details relating to generating the contextual attribute data are discussed below in relation to FIG. 3.

As shown, each DCN 105 also includes a virtual network interface card (VNIC) 155 in some embodiments. Each VNIC is responsible for exchanging messages between its DCN and the software forwarding element (SFE) 112. Each VNIC connects to a particular port 160-165 of the SFE 112. The SFE 112 also connects to a physical network interface card (PNIC) (not shown) of the host. In some embodiments, the VNICs are software abstractions created by the hypervisor of one or more physical NICs (PNICs) of the host.

In some embodiments, the SFE 112 maintains a single port 160-165 for each VNIC of each DCN. The SFE 112 connects to the host PNIC (through a NIC driver [not shown]) to send outgoing messages and to receive incoming messages. In some embodiments, the SFE 112 is defined to include a port 160-165 that connects to the PNIC's driver to send and receive messages to and from the PNIC. The SFE 112 performs message-processing operations to forward messages that it receives on one of its ports to another one of its ports. For example, in some embodiments, the SFE 112 tries to use data in the message (e.g., data in the message header) to match a message to flow-based rules, and upon finding a match, to perform the action specified by the matching rule (e.g., to hand the message to one of its ports 160-165, which directs the message to be supplied to a destination DCN or to the PNIC).

In some embodiments, the SFE 112 is a software switch, while in other embodiments it is a software router or a combined software switch/router. The SFE 112, in some embodiments, implements one or more logical forwarding elements (e.g., logical switches or logical routers) with SFEs 112 executing on other hosts in a multi-host environment. A logical forwarding element, in some embodiments, can span multiple hosts to connect DCNs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the DCNs of one logical network from the DCNs of another logical network that is serviced by another logical forwarding element. A logical forwarding element can connect DCNs executing on the same host and/or different hosts, both within a datacenter and across datacenters. In some embodiments, the SFE 112 extracts from a data message a logical network identifier (e.g., a VNI) and a MAC address. The SFE 112 in these embodiments uses the extracted VNI to identify a logical port group, and then uses the MAC address to identify a port within the port group.

Software switches (e.g., software switches of hypervisors) are sometimes referred to as virtual switches because they operate in software and they provide the DCNs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 2 Networks over Layer 3 Networks, IETF.

The ports of the SFE 112, in some embodiments, include one or more function calls to one or more modules that implement special input/output (I/O) operations on incoming and outgoing messages that are received at the ports 160-165. Examples of I/O operations that are implemented by the ports 160-165 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports 160-165 can implement a chain of I/O operations on incoming and/or outgoing messages in some embodiments. Also, in some embodiments, other modules in the data path (such as the VNICs 155 and the ports 160-165, etc.) implement the I/O function call operations instead of, or in conjunction with, the ports 160. In some embodiments, one or more of function calls of the SFE ports 160-165 can be to service engines 115 that query context engine 110 for context information that service engines 115 use, in some embodiments, to generate context headers (e.g., headers including context data) that include context used in providing a service at the service engines 115 and, in some embodiments, identify service rules applied to provide the service. In some embodiments, the generated context headers are then provided through the port 160-165 of SFE 112 to flow exporter 170 (e.g., flow identifier and statistics collector 171).

Flow exporter 170 monitors flows, collects flow data and statistics, aggregates flow data into flow group records, and publishes flow group records for consumption by the analysis appliance. In some embodiments, flow exporter 170 generally aggregates statistics for individual flows identified during multiple time periods, and for each time period identifies multiple groups of flows with each group including one or more individual flows. For each identified group, flow exporter 170 identifies a set of attributes by aggregating one or more subsets of attributes of one or more individual flows in the group as described below in greater detail. In some embodiments, the subset of attributes of each individual flow in each group is the aggregated statistics of the individual flow. After the multiple time periods, flow exporter 170 provides the set of attributes for each group identified in the multiple time periods to a server (e.g., an analysis appliance) for further analysis of the data flows identified.

As shown, flow exporter 170 includes flow identifier/statistics collector 171, flow identifier and statistics storage 172, flow collector timer 173, flow collector 174, first-in first-out (FIFO) storage 175, configuration data storage 176, flow aggregator 177, flow group record storage 178, a flow publisher timer 179, and a flow group record publisher 180 for collecting and processing flow data to produce aggregated flow group records and publishing the set of flow aggregated records.

Flow exporter 170 receives flow information, including flow identifiers and statistics, at flow identifier/statistics collector 171. In some embodiments, the received flow information is derived from individual data messages that make up the flow and includes context data used in making service decisions at service engines 115. Flow exporter 170 stores the received information associated with particular flows in flow identifier and statistics storage 172. The statistics, in some embodiments, are summarized (accumulated) over the life of the particular flow (e.g., bytes exchanged, number of packets, start time, and duration of the flow).

Flow collector 174, in some embodiments, monitors the flows to determine which flows have terminated (e.g., timeouts, FIN packets, RST packets, etc.) and collects the flow identifiers and statistics and pushes the collected data to FIFO storage 175. In some embodiments, flow collector 174 collects additional configuration data from configuration data storage 176 and includes it with the data collected from flow identifier and statistics storage 172 before sending the data to FIFO storage 175.

Additionally, the flow collector 174, in some embodiments, collects data for long-lived active flows (e.g., flows lasting longer than half a publishing period) from flow identifier and statistics storage 172 before the end of a publishing period provided by flow publisher timer 179. In some embodiments, the data collected for a long-lived active flow is different from the data collected for terminated flows. For example, active flows are reported using a start time, but without a duration in some embodiments. Only flows meeting certain criteria are collected by flow collector 174 in some embodiments. For example, only information for flows using a set of particular protocols (e.g., TCP, UDP, ESP, GRE, SCTP) are collected, while others are dropped or ignored. In some embodiments, additional types of traffic, such as broadcast and multicast, safety check (e.g., having ruleID=0 or 0 rx and tx byte/packet counts), L2 flows, flows which are not classified as one of (1) inactive, (2) drop, or (3) reject, are dropped (i.e., not collected or not placed into FIFO storage 175). The process for collecting data into flow identifier and statistics storage 172 and pulling it into FIFO storage 175 is described in more detail below in relation to FIGS. 4, 5, and 6.

In some embodiments FIFO storage 175 is a circular or ring buffer such that only a certain number of sets of flow identifiers and flow statistics can be stored before old sets are overwritten. In order to collect all the data placed into FIFO storage 175, or at least to not miss too much (e.g., miss less than 5% of the data flows), flow aggregator 177 pulls data stored in FIFO storage 175 based on a flow collection timer 173 and aggregates the pulled data into aggregated flow group records. Some embodiments pull data from FIFO storage 175 based on a configurable periodicity (e.g., every 10 seconds), while other embodiments, alternatively or in addition to the periodic collection, dynamically determine when to collect data from FIFO storage 175 based on a detected number of data flows (e.g. terminated data flows, a total number of active data flows, etc.) and the size of FIFO storage 175. Each set of flow data pulled from FIFO storage 175 for a particular flow, in some embodiments, represents a unidirectional flow from a first endpoint (e.g., machine or DCN) to a second endpoint. If the first and second endpoints execute on the same host computer, in some embodiments, a same unidirectional flow is captured at different ports 160-165 of host 100. To avoid double counting a same data message provided to flow identifier 171 from the two ports 160-165, flow identifier 171 uses a sequence number or other unique identifier to determine if the data message has been accounted for in the statistics collected for the flow. Even if duplicate data messages for a single unidirectional flow have been accounted for, the flow aggregator 177 additionally, in some embodiments, combines sets of flow data received for the separate unidirectional flows into a single set of flow data. In some embodiments, this deduplication (deduping) of flow data occurs before further aggregation and in other embodiments occurs after an aggregation operation.

Figure 2A:
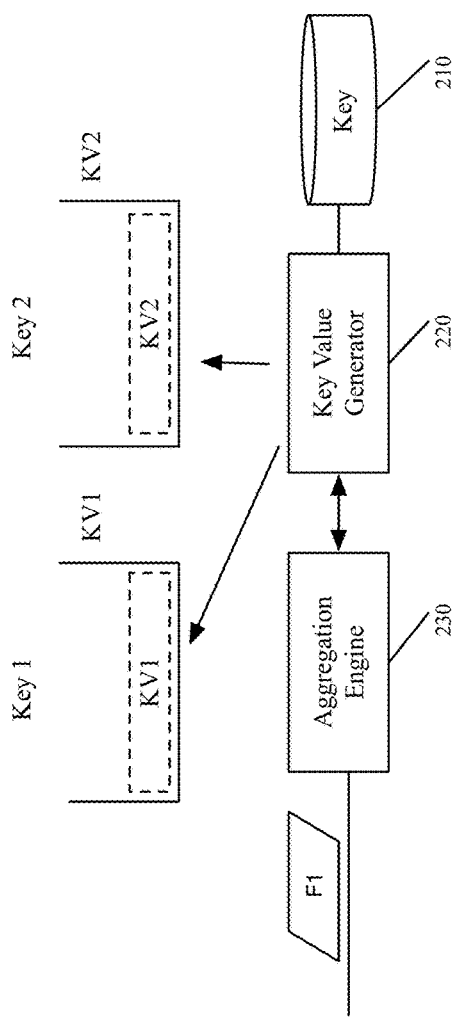
FIGS. 2A-2D illustrate components of an exemplary flow aggregator for aggregating particular flow data sets into particular aggregated flow group records.
Figure 2B:
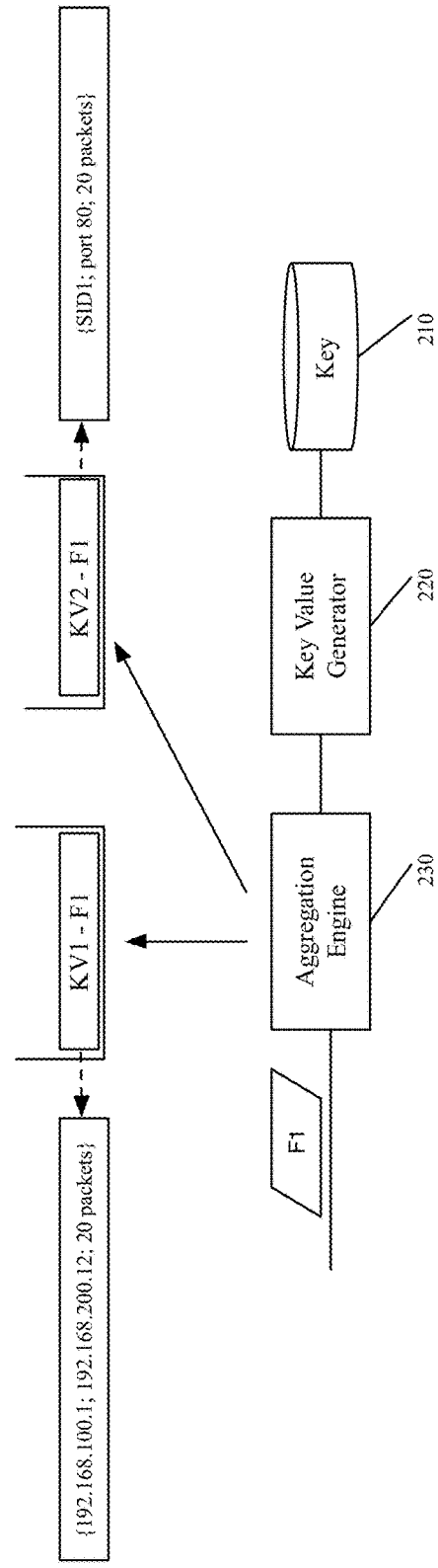

Flow aggregator 177, in some embodiments, receives a set of keys from the analysis appliance through the network manager computer as described above that specify how the flow data sets are aggregated. FIGS. 2A-2D illustrate components of an exemplary flow aggregator including key storage 210 storing the set of keys, key value generator 220 for dynamically generating key values for particular aggregated flow group records based on incoming flow data sets, and aggregation engine 230 for aggregating particular flow data sets into particular aggregated flow group records. FIG. 2A illustrates a set of two keys that generate two sets of aggregated records based on particular values for the two keys identified from flow data sets pulled from a FIFO storage. For example, a first key may specify a set of header values in the flow data sets (e.g., a source IP address, and a destination IP address) while the second key may specify a contextual attribute included in the data set (e.g., a process hash or security ID). Based on the keys, when a flow aggregator receives a first packet associated with a first flow, key value generator 220 generates key values KV1 and KV2 based on the values in the flow data set (e.g., {192.168.100.1; 192.168.200.12; SID1; port 80; 20 packets}) for the attributes specified by the two keys (e.g., KV1: {192.168.100.1; 192.168.200.12}, KV2: {SID1}). In this example, keys also specify attributes for which data is collected and ignored. For space considerations, key 1 will ignore everything except the number of packets exchanged and key 2 will ignore everything except the destination port and number of packets. FIG. 2B illustrates that after the key values are generated, aggregation engine 230 puts the attributes from the first packet into the flow group records for the different key values for the first and second keys.

Figure 2C:
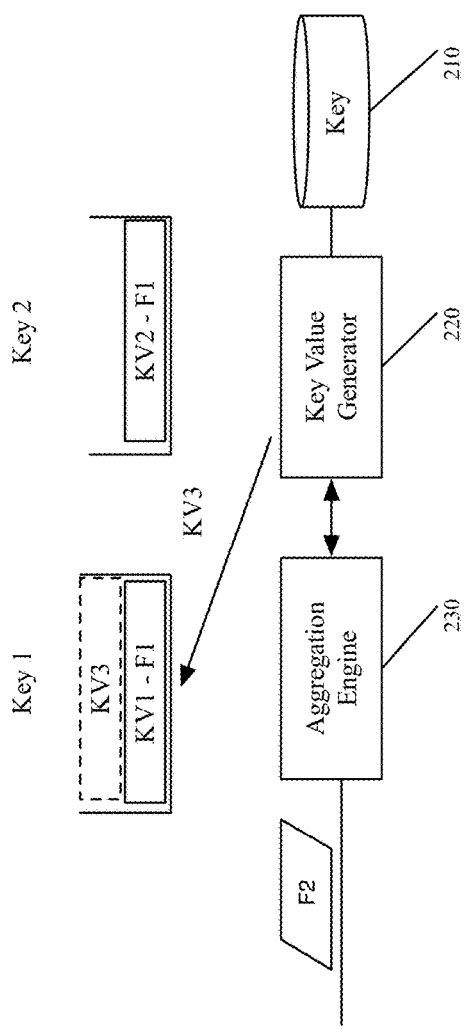
Figure 2D:
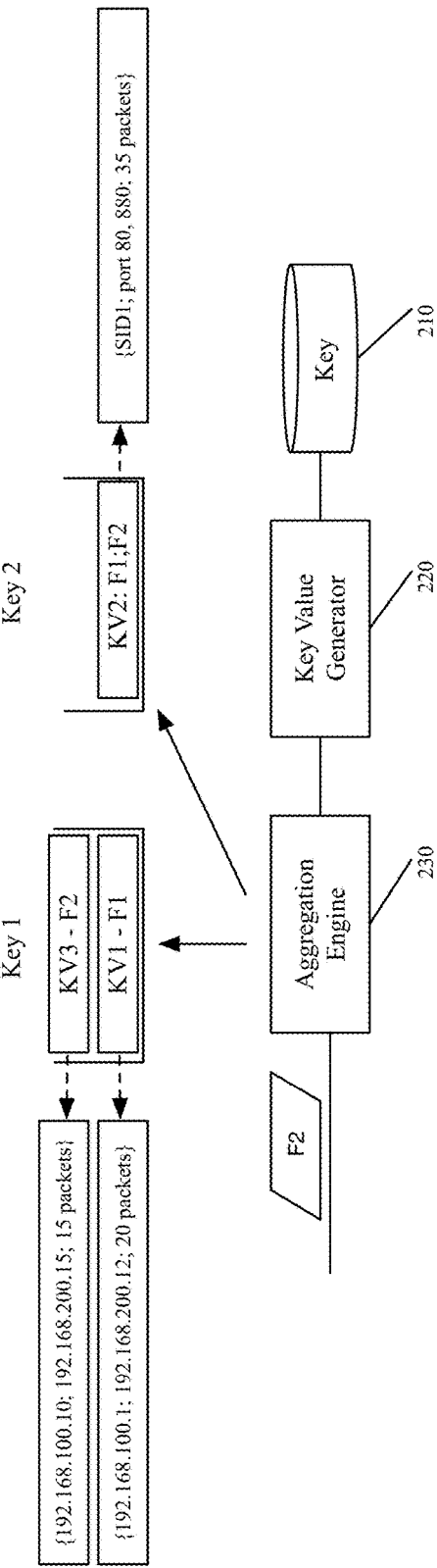

FIG. 2C illustrates a second set of flow data for a second flow being received (i.e., flow 2 [F2] having values {192.168.100.10; 192.168.200.15; SID1; port 880; 15 packets). Key value generator 220 determines that the key values of the second flow for key 1 are not the same as those of the first flow and generates a second flow group record for key 1 (e.g., KV3: {192.168.100.10; 192.168.200.15}), but determines that the SID of the second flow is SID1 and does not need to generate a new key value for key 2. FIG. 2D illustrates aggregation engine 230 placing the information from the second set of flow data (192.168.100.10; 192.168.200.15; 15 packets) into the newly generated record for key value 3 (KV3) and placing the information from the second set of flow data (e.g., port 880; 15 packets) into the previously created record for key value 2 (KV2) for the second key (to result in a aggregated flow group record {SID1; ports 80, 880; 35 packets}). The record for KV2 now has information for the first and second sets of flow data. In some embodiments, the flow data for each attribute (e.g., source IP address, source port, destination IP address, destination port, protocol, flow start, flow duration, bytes, packets, SID, process hash, machine ID, version tag, service rules hit, etc.) included in the sets of flow data is concatenated, in other embodiments, only unique attribute values are added to the record for the key value, or some combination of the two methods for aggregating data is used in conjunction with other methods that are appropriate for different attributes (e.g., keeping only an earliest start time or accumulating duration, number of bytes exchanged, and number of packets exchanged for all aggregated flows).

Flow aggregator 167, after aggregating the flows, in some embodiments, performs a deduplication process to combine aggregated flow group records for two unidirectional flows between two DCNs 105 executing on host machine 100 into a single aggregated flow group record and stores the aggregated records in flow group record storage 178. From flow group record storage 178, flow group record publisher 180 publishes the aggregated flow group records to an analysis appliance according to a configurable timing provided by flow publisher timer 179. After publishing the aggregated flow group records (and, in some embodiments, receiving confirmation that the records were received), the records stored for the previous publishing time period are deleted and a new set of aggregated flow group records are generated. Additional details of the aggregation process are described below in relation to FIG. 7 below.

In some embodiments, one of flow aggregator 177 or context engine 110 performs another correlation operation to associate the sets of correlated contextual attributes stored in contextual attribute storage 145 with the aggregated flow group records stored in flow group record storage 178. In some embodiments, the correlation includes generating new flow group records with additional attribute data included in existing attribute fields or appended in new attribute fields. In other embodiments, the sets of correlated contextual attributes and aggregated flow group records are tagged to identify related sets of aggregated flow group records and contextual attribute data. In some embodiments, the generated new flow group records are published from one of the publishers (e.g., flow group record publisher 180 or context publisher 147) while in other embodiments, flow group record publisher 180 publishes the tagged aggregated flow group records and context publisher 147 publishes the tagged sets of correlated contextual attributes.

Anomaly detection engine 122, in some embodiments, receives flow data (from any of flow identifier and statistics storage 172, FIFO storage 175, or flow group record storage 178) and context data from context engine 110 and detects, based on the received data, anomalous behavior associated with the flows. For example, based on context data identifying the application or process associated with a flow, anomaly detection engine 122 determines that the source port is not the expected source port and is flagged as anomalous. The detection in some embodiments includes stateful detection, stateless detection, or a combination of both. Stateless detection does not rely on previously collected data at the host, while stateful detection, in some embodiments, maintains state data related to flows and uses the state data to detect anomalous behavior. For example, a value for a mean round trip time (RTT) or other attribute of a flow and a standard deviation for that attribute may be maintained by anomaly detection engine 122 and compared to values received in a current set of flow data to determine that the value deviates from the mean value by a certain number of standard deviations that indicates an anomaly. In some embodiments, anomaly detection engine 122 appends a field to the set of context data that is one of a flag bit that indicates that an anomaly was detected or an anomaly identifier field that indicates the type of anomaly detected (e.g., a change in the status of a flow from allowed to blocked [or vice versa], a sloppy or incomplete TCP header, an application/port mismatch, or an insecure version of an application). In some embodiments, the additional context data is provided to context engine 110 separately to be correlated with the other context data received at context engine 110. As will be understood from the discussion above by a person having ordinary skill in the art, the anomaly detection process, in some embodiments, uses contextual attributes not in L2-L4 headers such as data included in L7 headers and additional context values not found in headers.

In some embodiments, anomaly detection engine 122 takes an action or generates a suggestion based on detecting the anomaly. For example, anomaly detection engine 122 can block an anomalous flow pending user review or suggest that a new firewall rule be added to a firewall configuration.

Machine learning engine 124, in some embodiments, receives flow data (from any of flow identifier and statistics storage 172, FIFO storage 175, and flow group record storage 178) and context data from context engine 110 and performs analysis of the received data. The received data (e.g., flow group records), in some embodiments, includes attributes normally recorded in a five tuple as well as additional L7 attributes and other contextual attributes such as user sid, process hash, URLs, appId, etc., that allow for better recommendations to be made (e.g., finer-grained firewall rules). In some embodiments, the analysis identifies possible groupings of DCNs 105 executing on host computer 100. In some embodiments, the analysis is part of a distributed machine learning processing and the results are provided to context engine 110 as an additional contextual attribute.

Figure 3:
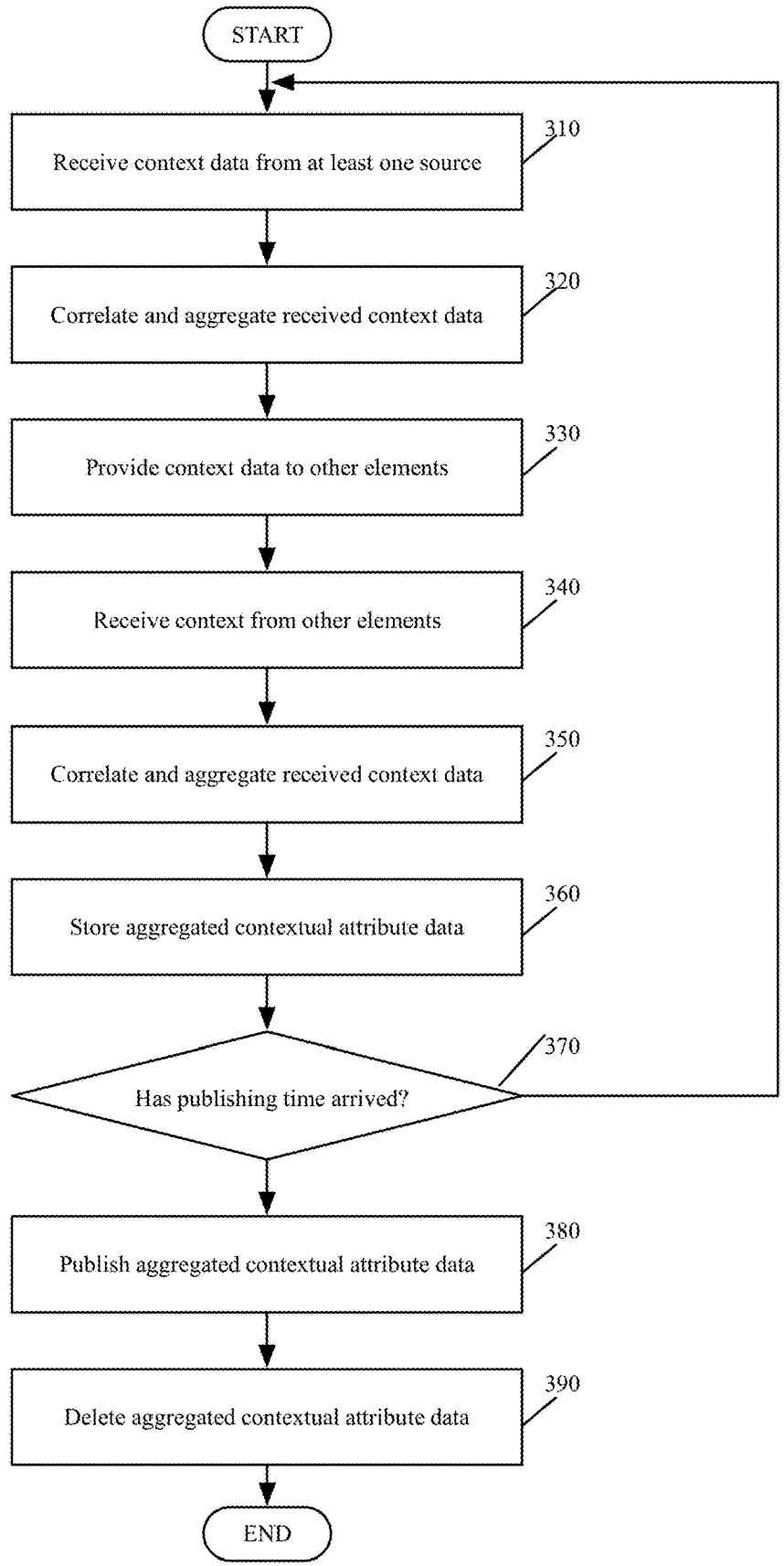
FIG. 3 conceptually illustrates a process for collecting context data including contextual attributes.

Now that the elements of an exemplary host computer have been described. FIG. 3 conceptually illustrates process 300 for collecting context data including contextual attributes. In some embodiments, process 300 is performed by context exporter 140. Process 300 begins (at 310) by receiving context data from at least one source of context data. The source of context data, in different embodiments, are different combinations of any or all of a set of guest introspection agents (e.g., through a multiplexer), a set of service engines, a threat detector/DPI module, third party software (or processes), an anomaly detector, and an ML engine.

Once context data has been received (at 310) the process 300 correlates and aggregates (at 320) the different sets of context data received from the at least one source of context data. In some embodiments, the correlation is based on common attributes (e.g., context data from multiple sources include at least one of a security ID, an IP address, a machine identifier, a process hash, etc.) with different context data set pairs having different common attributes that allow a complete set of context data to be stitched together. Once related sets of context data are identified, some embodiments aggregate related contextual attributes into a single aggregated contextual attribute set. As process 300 is an ongoing process, the correlation and aggregation, in some embodiments, correlates and aggregates received data to previously stored correlated and aggregated context data. In some embodiments, the context data for each contextual attribute (e.g., source IP address, source port, destination IP address, destination port, protocol, SID, process hash, machine ID, version tag, service rules hit, CPU usage, memory usage, guest events, machine events, etc.) included in the sets of context data is concatenated in a corresponding field for the attribute. In other embodiments, only unique attribute values are added to the aggregated contextual attributes, or some combination of the two methods for aggregating data is used in conjunction with other methods that are appropriate for different attributes. Contextual attribute sets, in different embodiments, are aggregated for any or all of each machine executing on the host (e.g., by machine identifier or IP address), each key value generated by a flow aggregator for flow group records (e.g., in embodiments that correlate flow group records to context data), or each of a set of flow tuples used to identify individual flows.

After context data has been correlated and aggregated (at 320), the process 300 continues by providing (at 330) at least a subset of the contextual data attributes for at least one aggregated contextual data set to other elements of the system executing on the host. In some embodiments, certain attributes (e.g., SID or a process hash) associated with a particular flow are provided to a service engine to enable the service engine to perform a context-aware service. In some embodiments, contextual attribute data is provided to any or all of an anomaly detection engine, an ML engine, and a threat detection module for the recipient element to perform analysis based on the contextual attributes (along with data received from other sources, in some embodiments.) In some embodiments, the attributes are provided to the other elements based on requests or queries from the other elements.

Once the context data is provided (at 330) to the set of other elements, the process 300 receives (at 340) additional context data from the other elements. In some embodiments, the received additional context data is from an anomaly detection engine that indicates whether an anomaly had been detected that was associated with a particular flow or set of context data received (e.g., at 330). The additional context data, in some embodiments, is from a machine learning engine that provides the results of an analysis of data (including context data previously received). In some embodiments, the additional context data is received from a service engine and indicates a service rule that is used (e.g., is hit) in processing a particular data message in a flow. One of ordinary skill in the art will appreciate that receiving (at 340) the additional context data is indistinguishable from receiving (at 310) context data from the different sources as the collection process is an ongoing process, in some embodiments, and is included here only to indicate that collected context data is used in such embodiments to generate additional context data.

Once the additional context data is received (at 340), the process 300 correlates (at 350) the received additional context data similarly to the operation at 320. As described above, in some embodiments, the additional context data is a new attribute such as an indicator (e.g., a flag) of whether an anomaly (e.g., anomalous behavior) has been detected that is associated with a particular machine or flow. The additional context data, in some embodiments, is a set of new attributes that indicate at least one of a type of anomaly detected (either in addition to, or in place of, a flag value indicating anomalous behavior), a service rule used to process a flow, a result of the analysis performed by a ML engine, etc.

Once the additional context data has been correlated (at 350), the process 300 stores (at 360) the correlated and aggregated contextual data in a contextual attribute storage. In some embodiments, the stored aggregated contextual data serves as a basis for aggregating additional context data as it is received.

The process 300 then determines (at 370) whether a publishing time has arrived. In some embodiments, the publishing time is received from a separate element of the host, in other embodiments, a configuration for the publishing time is received from another element and a context publisher maintains a time used to determine when to publish the stored context attribute data. If the publishing time has not arrived, the process 300 proceeds to receive (at 310) additional context data for correlation and aggregation. One of ordinary skill in the art will appreciate that, as process 300 is an ongoing process, the determination is not performed at a fixed point in the process 300 and is shown that way for clarity.

If the process 300 determines (at 370) that the publishing time has arrived, the process 300 publishes (at 380) contextual attribute data stored in the contextual attribute storage to an analysis appliance that performs further processing of the contextual attribute data. As discussed above, in some embodiments, the contextual attribute data that is published is organized into contextual attribute data sets based on machine identifiers, a set of key values, or a set of flow tuples. In some embodiments, publishing the contextual attribute data includes receiving a confirmation that the published data has been received at the analysis appliance.

Once the process 300 publishes (at 380) the contextual attribute data (and, in some embodiments, receives a confirmation that the data has been received at the analysis appliance), the process 300 deletes (at 390) the published data and the process 300 ends. One of ordinary skill in the art will understand that, as the process ends, the process will begin (or even will have begun) again for a next publishing period by collecting new context data and generating new correlated and aggregated contextual attribute data sets.

Figure 4:
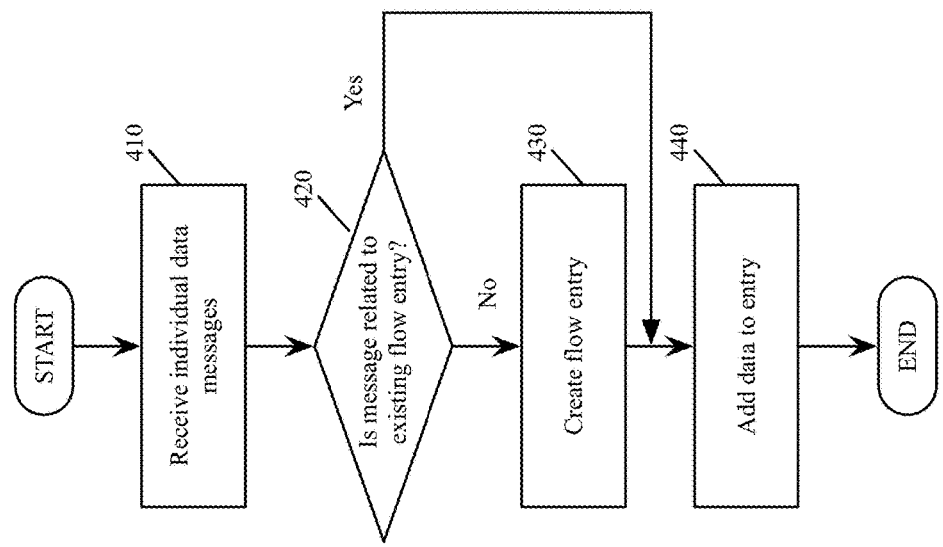
FIG. 4 conceptually illustrates a process for collecting flow identifiers and statistics.

FIG. 4 conceptually illustrates a process 400 for collecting flow identifiers and statistics. Process 400 in some embodiments is performed by a flow identifier and statistics collector of a flow exporter for each received data message associated with a flow. Process 400 begins by receiving (at 410) a data message (or data message report). The data message, in some embodiments, is received from a port of a software forwarding element. In some embodiments, instead of sending the entire data message, a data message report is sent. In some embodiments, the data message report includes the flow headers (including selected context headers inserted during flow processing) and excludes the payload of the data message and includes instead a size of the data message.

After receiving the data message (or data message report) (at 410), the process 400 determines if the data message is related to an existing entry for an active flow. If the process 400 determines (at 420) that the data message is not related to an existing entry for an active flow (e.g., if the data message is a SYN data message initiating a connection), the process 400 creates (at 430) a new flow entry for the new flow. In some embodiments, the flow entries are identified by a hash of the header values of the data messages. The new entry, in some embodiments, includes a start time as well as the flow identifiers.

If the process 400 determines (at 420) that the data message is related to an existing entry for an active flow or has created (at 430) an entry for the flow, the process 400 adds (at 440) data regarding the received data message to the entry. In some embodiments, adding the data includes incrementing a value for the number of packets exchanged, adding the number of bytes in the current data message to a value for the total bytes exchanged, and adding context data values to the entry. Context values are only added, in some embodiments, when they are not the same as any previous value stored in the entry. For termination data messages, an end time is added to the entry, in some embodiments. Once the data entry has been updated to account for the received data message, the process ends.

Figure 5:
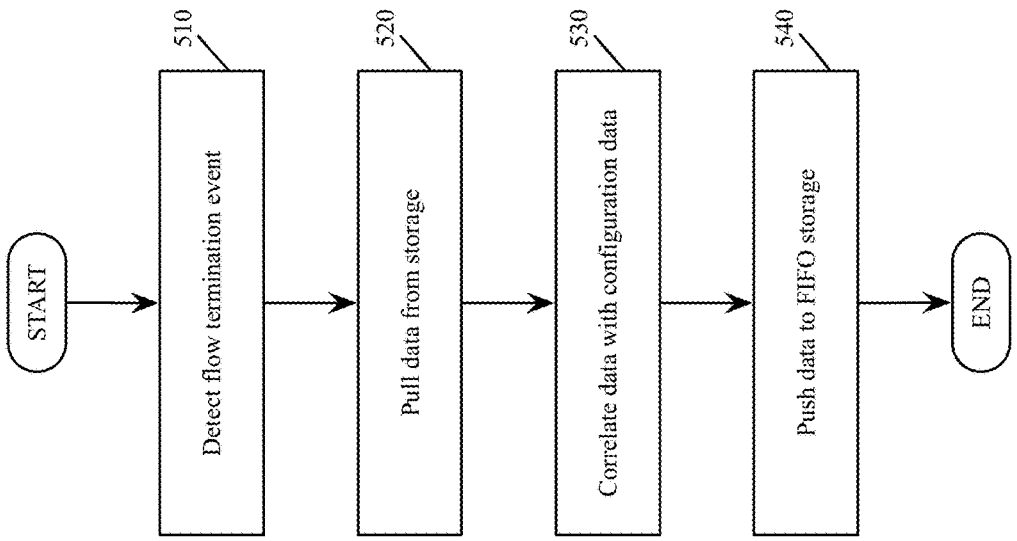
FIG. 5 conceptually illustrates a process for extracting data from a flow identifier and statistics storage and pushing it to a FIFO storage.

FIG. 5 conceptually illustrates a process 500 for extracting data from a flow identifier and statistics storage and pushing it to a FIFO storage. In some embodiments, process 500 is performed by a flow collector of a flow exporter. Process 500 begins by detecting (at 510) a flow termination event. In some embodiments, a flow termination event is any of a FIN data message, a RST data message, a timeout, or any similar event relevant to particular types of flows. In some embodiments, the data for an entry persists for a short time after a termination event for the flow and is then deleted or overwritten by data for a new data flow. In some embodiments, the flow collector is made aware of a termination event by either the component of the flow exporter that receives the data messages for collecting statistics or by a process of the storage that stores the statistics data.

Once a termination event has been detected (at 510), the process 500 pulls (at 520) the data for the terminated flow. In some embodiments, the pulled data includes the flow identifier and accumulated statistics. The context data added to a data message header by a service engine, in some embodiments, is also included in the pulled data (e.g., a service rule used to process the data message and a version of the configuration data for which the service rule was specified). In some embodiments, the process makes a determination based on the flow identifiers that the data is for a type of flow that is not needed for further processing. For example, only information for flows using a set of particular protocols (e.g., TCP, UDP, ESP, GRE, SCTP) are collected for further processing, while others are dropped or ignored. In some embodiments, additional types of traffic, such as broadcast and multicast, safety check (e.g., having ruleID=0 or 0 rx and tx byte/packet counts), L2 flows, flows which are not classified as one of (1) inactive, (2) drop, or (3) reject are also not placed into a FIFO storage (e.g., FIFO storage 175).

The process 500 then correlates (at 530) the data with configuration data (e.g., machine IDs related to IP addresses, or security groups related to SIDs) and includes the configuration data in the entry for the terminated flow. The configuration data, in some embodiments, is received from a network manager computer that maintains data for all the machines in the virtual environment. In some embodiments, the correlation with configuration data does not take place at the flow collector as part of process 500 but instead happens later in the processing of flow data either on the host or at the analysis appliance.

After the entry is pulled (at 520) and is (optionally) correlated (at 530) with configuration data, the process 500 pushes (at 540) the (correlated) data to a FIFO storage (e.g., a ring, or circular, buffer) to be collected by another process that provides the data to a flow aggregator. Once the data is put into the FIFO storage, the process 500 ends.

Figure 6:
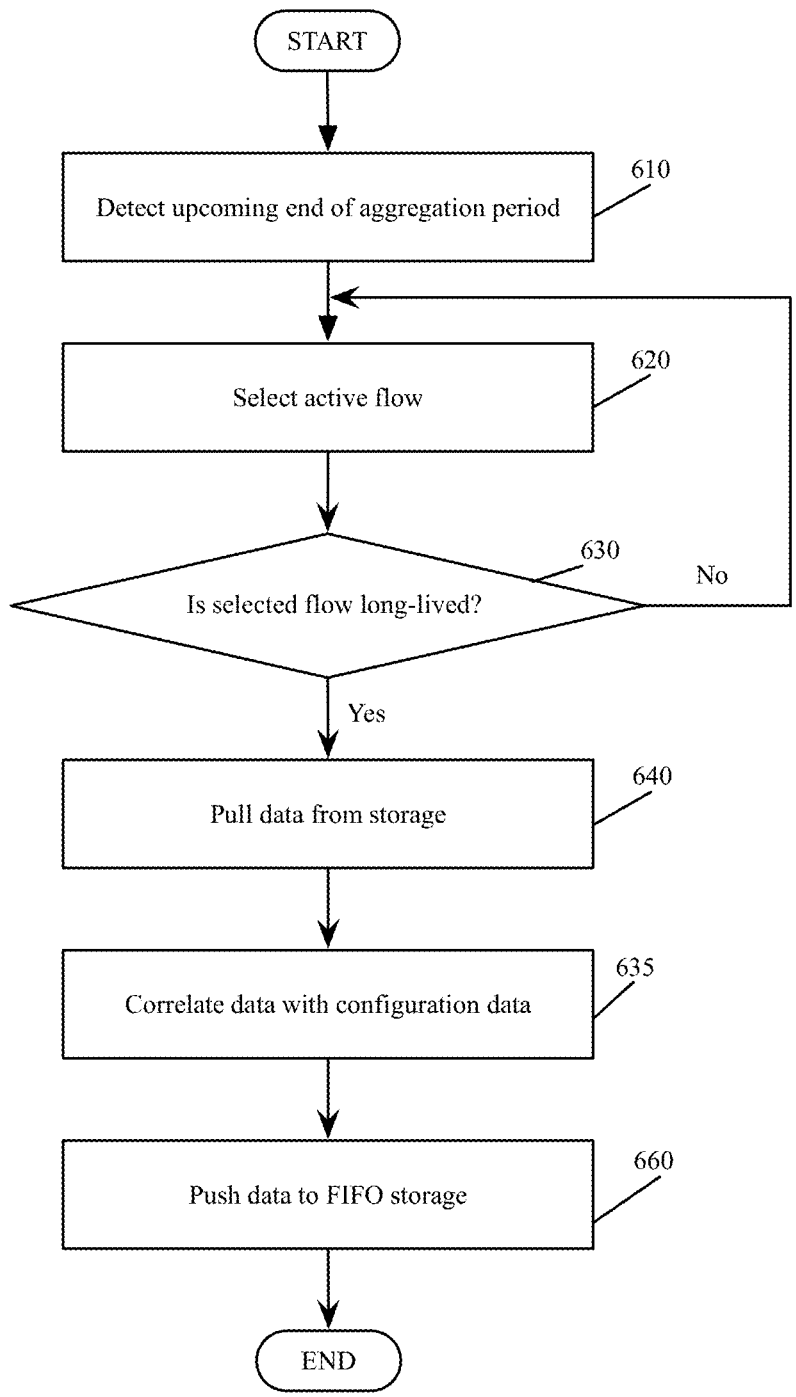
FIG. 6 conceptually illustrates a process for extracting data from a flow identifier and statistics storage for long-lived flows and pushing the data to a FIFO storage.

FIG. 6 conceptually illustrates a process 600 for extracting data from a flow identifier and statistics storage for long-lived flows and pushing the data to a FIFO storage. In some embodiments, process 600 is performed by a flow collector of a flow exporter. Process 600 begins by detecting (at 610) that the end of a current aggregation period is close (with closeness being defined at least in part by the amount of time it takes to perform process 600 and subsequent processing of the data derived from process 600). For example, 30 seconds before the end of an aggregation period of 5 minutes, process 600 will receive an indication that the aggregation period is coming to an end.

After detecting (at 610) that the aggregation period is coming to an end, the process 600 selects (at 620) an active flow to analyze for possible inclusion in the FIFO storage. The selection of an active flow, in some embodiments, begins with a first active flow in the flow identifier and statistics storage according to some attribute (e.g., a hash identifier, an index into the storage, etc.). An active flow, in some embodiments, is any flow for which a termination event has not yet been reported to (or detected by) the flow collector.

The process 600 then determines (at 630) whether the selected active flow is long-lived. The definition of a long-lived flow is configurable in some embodiments. In some embodiments, the definition of a long-lived flow depends on the aggregation period (a configurable parameter). For example, a long-lived flow, in some embodiments, is defined as a flow starting more than 3 minutes before an aggregation period is scheduled to end, or in other embodiments, it is defined as any flow starting earlier than the midpoint (or second quarter) of an aggregation period. In some embodiments, data for a same active flow is pulled during each aggregation period for which it is active after the first aggregation period in which the data for the active flow is pulled (with new statistics in each aggregation period). If a selected flow is determined (at 630) to not be a long-lived flow, the process 600 returns to 620 to select another active flow.

If the process 600 determines (at 630) that the flow is long-lived according to the criteria for long-lived flows, the process 600 pulls (at 640) the data for the long-lived flow. In some embodiments, the data pulled for the long-lived flow is different from the data pulled for terminated (i.e., inactive) flows. For example, terminated flows include both a start time and a duration, while long-lived flows merely record the start time. The long-lived flows are also treated differently in subsequent processing as will be described in relation to FIGS. 7 and 8.

The process 600 then correlates (at 650) the data with configuration data (e.g., machine IDs related to IP addresses, or security groups related to SIDs) and includes the configuration data in the entry for the long-lived flow. The configuration data, in some embodiments, is received from a network manager computer that maintains data for all the machines in the virtual environment. In some embodiments, the correlation with configuration data does not take place at the flow collector as part of process 600 but instead happens later in the processing of flow data either on the host or at the analysis appliance. After the entry is pulled (at 640) and is (optionally) correlated (at 650) with configuration data, the process 600 pushes (at 660) the (correlated) data to a FIFO storage (e.g., a ring, or circular, buffer) to be collected by another process that provides the data to a flow aggregator. Once the data is put into the FIFO storage, the process 600 ends.

Figure 7:
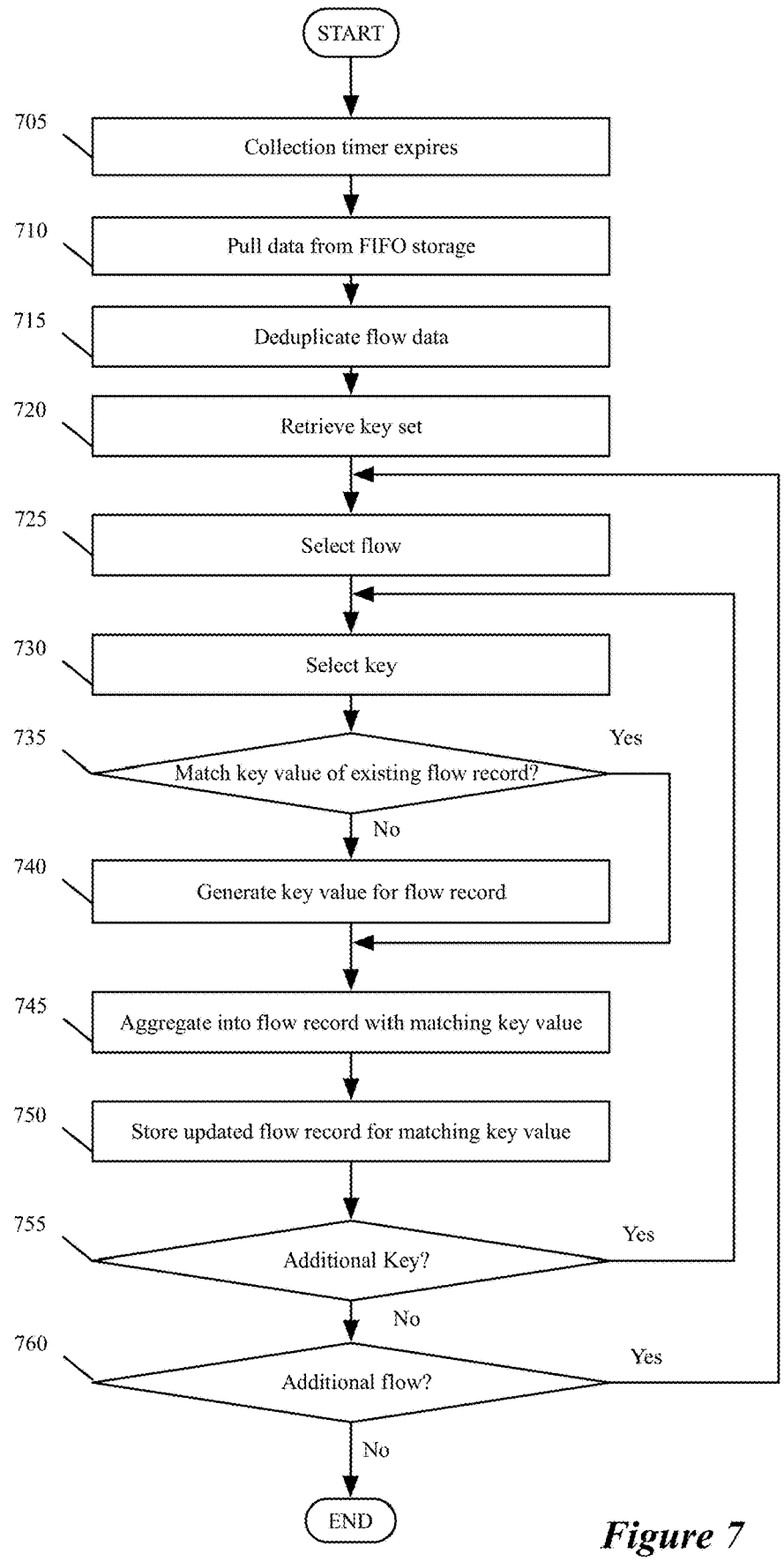
FIG. 7 conceptually illustrates a process for aggregating data that is extracted from the FIFO storage.

After data is loaded into the FIFO storage, it is consumed, in some embodiments, by a flow aggregator. FIG. 7 conceptually illustrates a process 700 for aggregating data that is extracted from the FIFO storage. Process 700, in some embodiments, is performed by a flow aggregator of a flow exporter. Process 700 begins by detecting (at 705) the expiration of a collection timer. In some embodiments, the collection timer is a timer allowing a user or configuration data to set a periodicity (e.g., 5 or 10 seconds). As discussed above, in some embodiments, the collection timer is alternatively or additionally based on a number of active flows and a size of the FIFO storage. For example, embodiments having smaller storages may use a shorter collection period, or in the presence of a larger number of active flows than anticipated the collection period.

After detecting (at 705) that the collection timer has expired, the process 700 pulls (at 710) data for individual flows (not individual data messages of flows). In some embodiments, the pulled data includes flow identifiers such as the IP address for source and destination machines, source and destination ports, a protocol used by the flow and additional context data (SID, service rule identifiers, config version, etc.) that can be used to identify the flow. The pulled data, in some embodiments, also includes statistic data such as start times, durations (for inactive flows), number of bytes, and number of packets exchanged. Some embodiments also store configuration data in the record for the flow in the FIFO storage.

After the data is pulled (at 710) from the FIFO storage, the process 700 (at 715) deduplicates the pulled data. In some embodiments, a first deduplicating process for the pulled data is done to remove data for flows based on the same data messages being captured at two ports on the host by throwing out one of the sets of data after incorporating any unique data in the discarded flow group record. As discussed above, this first level of deduplicating, in some embodiments, is performed in the data collection stage by ignoring a second data message that shares a sequence number with a previously processed data message. A second level of deduplicating to aggregate two unidirectional flows with "mirror image" header values between two machines on the host is performed, in some embodiments. In some embodiments, it is easier to perform this at this point in the aggregation because all the attributes of the two unidirectional flows are still present to determine that they are related to a same flow. In other embodiments, this deduplicating process is not performed at this point in order not to combine flows that would otherwise result in richer data (e.g., if source IP [or some other attribute that will be changed in aggregating one of the unidirectional flows into the other] is relevant in both directions).

After deduplicating (at 715) the pulled flow data, the process 700 retrieves (at 720) a set of keys from a key storage that define the aggregation operations. In some embodiments, the keys are received from a network manager computer. The network manager in turn receives the keys from the analysis appliance. In some embodiments, the key definitions are provided to each host computer to associate individual flows into groups of flows and to identify a set of attributes for each group by associating the set of attributes of each flow in the group with the group as will be described in further detail below. In some embodiments, the key definitions are based on user input and a user, in some embodiments, provides a new key definition based on the results of previous aggregation and analysis operations. The new key definitions, in some embodiments, associate individual flows into at least one new group of flows, identify for the new group a set of attributes by associating the set of attributes of each flow in the group with the new group, and provide the set of attributes for the new group for analysis. In some embodiments, the network manager computer instructs the host to use the new key and to discard the previous key. The generated key, in some embodiments, is generated by modifying a previous key definition and adds a new attribute for aggregation or generating key values. In some embodiments, the key generated by modifying the previous key additionally, or alternatively, removes an attribute for aggregation or used to generate key values.

The keys, in some embodiments, are defined at the beginning of an aggregation period so that data analysis for the entire period is consistent, in other embodiments, keys can be adjusted in the middle of an aggregation period to reflect an updated organization of the information that a user desires. In some embodiments, the keys used for each collection period are determined at the beginning of the collection period.

After retrieving (at 720) the key set to use for aggregating the pulled flow data, the process 700 selects (at 725) a particular set of flow data to process and (at 730) a particular key to use to aggregate data. The selected set of flow data is for a particular inactive or long-lived flow in some embodiments. As discussed above, a key in the set of keys, in some embodiments, specifies a set of attributes that are "of interest" (i.e., that will define flow group records [or "buckets"]). For instance, a key may specify that a source IP address, destination IP address, destination port, and protocol are "of interest" and each set of flow data with a unique combination of these four values will define a new flow group record ("bucket"). Keys specifying attributes "of interest", in some embodiments, specify ranges of values that are not considered unique (all non-private-address-space IP addresses are to be considered the same as "any" IP address) such that, in the previous example, all traffic from a particular IP address to a same destination port using a same protocol to any external IP address is aggregated into a same flow group record ("bucket") despite the external IP addresses being different. Additionally, or alternatively, keys, in some embodiments, specify (as positive or negative conditions) ranges of values for attributes for which data should be collected or ignored. For example, a particular key may specify that only flows with source IP addresses in the address ranges 10.0.0.0/8, 192.168.0.0/16, and 172.16.0.0/12 are "of interest" and any others should be ignored (dropped) or, as for external addresses above, should be considered a same "any" address.

In some embodiments, a key specifies specific attribute values that are "of interest" such that, for that key, only flows having the specific attribute values are aggregated into the flow group records for that key. The keys, in some embodiments, also specify attributes that should not be aggregated for flow group records associated with the key such that the flow group record for the key does not have a field for that attribute. Additionally, or alternatively, some keys specify (either positively or by omission) attribute values for which flows should be ignored. For example, a key may specify that no flows should be aggregated unless they specify a protocol in a provided list (e.g., TCP, UDP, ESP, GRE, SCTP), or alternatively, that flow data including a particular set of port numbers (e.g., 80 and 21) should be ignored. In some embodiments, these conditions are pushed down to the flow collector or even the flow identifier stat collector such that ignored flows are not collected (if all keys specify a same set of ignore fields). One of ordinary skill in the art will appreciate that any attribute (e.g. header values, context data, or statistics) may be specified as any of the above types (e.g., specific value, range, "of interest", ignore, drop, etc.) of key attributes.

Once the flow and key have been selected (at 725 and 730 respectively), the process 700 determines (at 735) if a flow group record exists for the key value that matches the values in the selected flow data for the specified attributes in the selected key. If a flow group record does not exist for the set of attribute values of the selected flows specified in the selected key, the process 700 generates (at 740) a new flow group record ("bucket") for aggregating data into. The flow group record generation, in some embodiments, generates a set of key values based on the attributes "of interest" specified in the key. For example, if the attributes "of interest" for the selected key are the source IP address and destination port, a flow group record will be generated for the values of those attributes in the selected flow data set (the set of values identifying a "key value") and all other flow data sets sharing the "key value" will be aggregated into that flow group record as described below.

If the process 700 determines (at 735) that a matching flow group record exists or after a new flow group record is generated (at 740), the process 700 aggregates (at 745) the flow data set into the flow group record with the matching key value. As discussed above, in some embodiments, the flow data for each attribute (e.g., source IP address, source port, destination IP address, destination port, protocol, flow start, flow duration, bytes, packets, SID, process hash, machine ID, version tag, service rules hit, etc.) included in the sets of flow data is concatenated, in other embodiments, only unique attribute values are added to the record for the key value, or some combination of the two methods for aggregating data is used in conjunction with other methods that are appropriate for different attributes (e.g., keeping only an earliest start time, accumulating duration, number of bytes exchanged, and number of packets exchanged for all aggregated flows, or recording hashes of unique attributes [e.g., URLs]). As discussed above, for the selected key, the aggregation is based on the specific attributes specified (either positively or negatively) to be collected, ignored, etc. In some embodiments, flow group records for certain keys are locally deduplicated as part of the aggregation process such that, for flows between two machines executing on the host, the flow group records that represent related unidirectional flows between the two machines are merged into a single flow group record. In some embodiments, flow data sets for long-lived flows are not aggregated and are instead treated as unique flow group records without reference to any keys.

After aggregating (at 745) the selected set of flow data into the flow group record, the flow group record is stored (at 750) until the next aggregation operation. In some embodiments, the flow group records are stored in a flow group record storage of a flow exporter. The process 700 then determines (at 755) whether additional keys have not yet been applied to the selected flow data. If the process 700 determines (at 755) that additional keys have not yet been applied, the process 700 selects (at 730) another key and continues processing the selected flow data set. If the process 700 determines (at 755) that no additional keys have not yet been applied, the process determines (at 760) whether additional flow data sets pulled from the FIFO storage have not been processed. If the process 700 determines (at 760) that there are additional unprocessed flow data sets, the process 700 selects (at 725) one of the unprocessed flow data sets and continues processing the selected flow data set. If the process 700 determines (at 760) that there are no additional unprocessed flow data sets, the process 700 ends.

Figure 8:
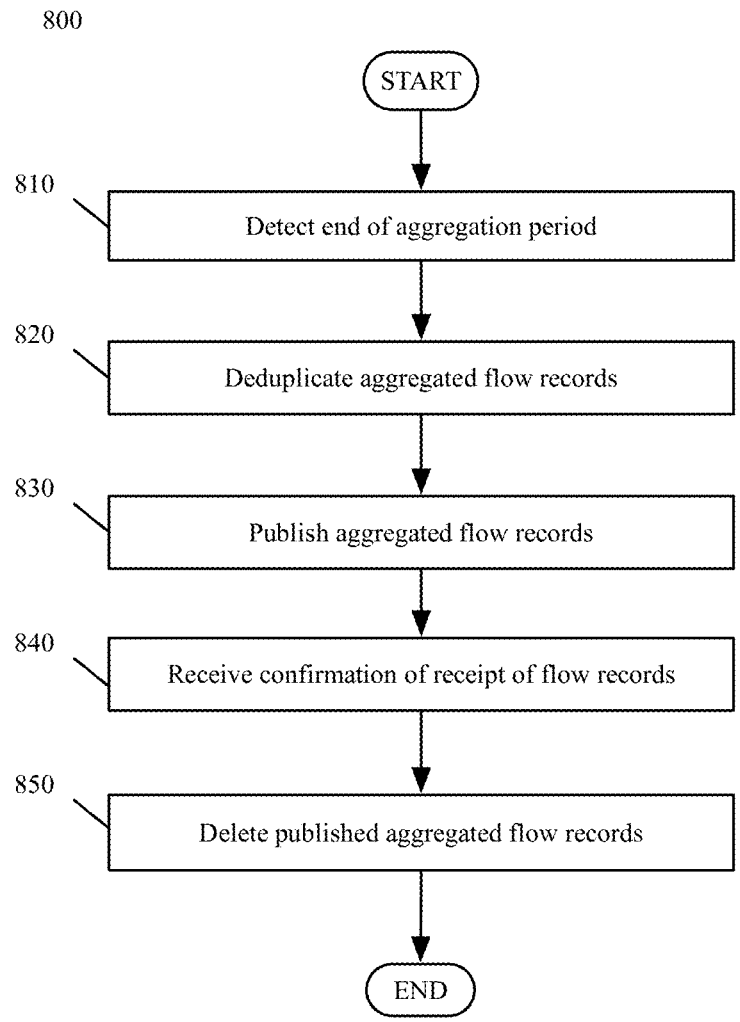
FIG. 8 conceptually illustrates a process for preparing flow group records for publishing and publishing the flow group records to the analysis appliance.

Once aggregated flow group records are stored in flow group record storage, they are available for publishing to the analysis appliance. In some embodiments, an additional round of processing is performed by the flow aggregator. FIG. 8 conceptually illustrates a process 800 for preparing flow group records for publishing and publishing the flow group records to the analysis appliance. Process 800 begins by detecting (at 810) the end of an aggregation period. In some embodiments, the end of the aggregation period is detected by a receiving a signal from a publisher timer, in other embodiments, the publisher timer configures a timer of the flow group record publisher that sends a signal to the flow aggregator that it should begin a new aggregation period and perform any final processing of flow group records for publishing to the analysis appliance.

The process 800 then deduplicates (at 820) aggregated flow group records. In some embodiments, this deduplication process combines flow group records that are based on related unidirectional flows that have not been combined or merged in previous processing. For example, for machines on a same host that exchange data messages as part of a same flow, a first flow group record is created for data messages in a first direction based on the source and destination IP address of the data messages in the first direction and a second flow group record is created for data messages in a second direction based on the mirrored source and destination IP address of the data messages in the second direction. The deduplication in such a situation identifies such mirrored flow group records and combines unique data contained in each flow group record and then discards at least one of the original records (or both if a new flow group record for the combined flow was generated). In some embodiments, identifying mirrored flow group records for deduplication includes identifying flow group records for which attributes associated with the source and destination (e.g., IP addresses) are flipped and other attributes that are not associated specifically with either source or destination (e.g., number of bytes, duration, start time, number of packets, etc.) are identical. The deduplicating, in some embodiments, is omitted to be performed, if at all, at the analysis appliance.

After deduplicating (at 820) the flow group records are published (at 830) to the analysis appliance. In some embodiments, publishing (at 830) the aggregated flow group records includes publishing the records using a communication protocol that is topic-based (e.g., Kafka™) such that flow group records are associated with a different topic than is associated with the contextual attribute data published by a context exporter.

After publishing (at 830) the aggregated flow group records to the analysis appliance, the process 800 receives (at 840) a confirmation that the flow group records have been received by the analysis appliance. In some embodiments, the confirmation includes a hash value or other value serving the function of a checksum to ensure that the data was transmitted and received intact. The confirmation is necessary, in some embodiments, because the aggregated flow group records for an aggregation period are not persisted on the host and a failed transmission could lead to a complete loss of the data. Accordingly, once the confirmation is received (at 840), the process 800 deletes (at 850) the aggregated flow group records for the published aggregation period. In some embodiments, flow group records are specific to a particular aggregation period and aggregation for a subsequent period begins during the publishing process. Once the published flow group records are deleted (at 850), the process 800 ends. In some embodiments, the hosts include a backup system for storing flow group records and contextual attributes in case of a disruption in the communication with the analysis appliance (e.g., during an analysis appliance upgrade).

Figure 9:
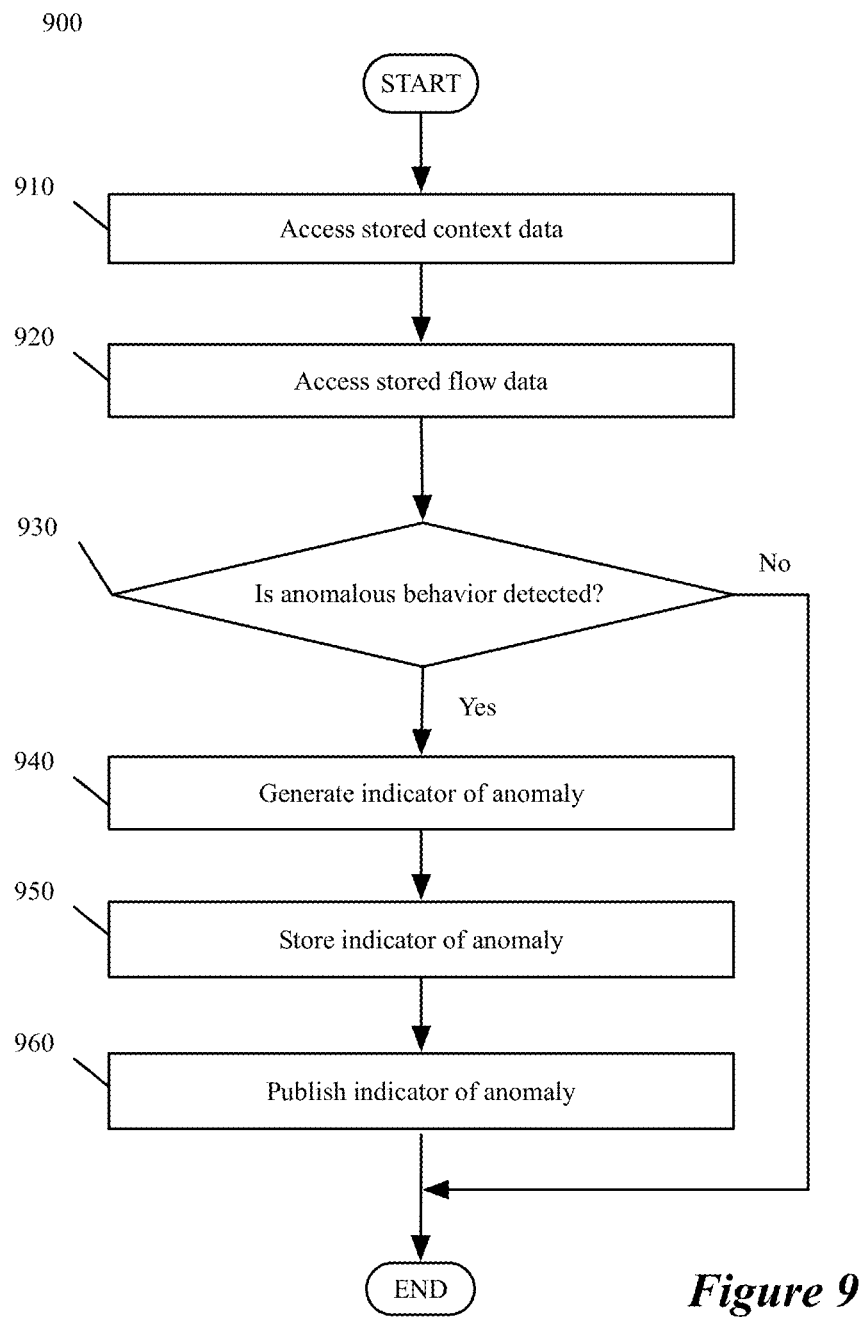
FIG. 9 conceptually illustrates a process for detecting anomalies based on the collected data on the host.

In addition to aggregating data for publishing to the analysis appliance, some embodiments also perform analysis on the host to reduce the burden on the analysis appliance. FIG. 9 conceptually illustrates a process 900 for detecting anomalies based on the collected data on the host. In some embodiments, process 900 is performed by an anomaly detection engine on the host. Process 900, in some embodiments, represents an anomaly detection process for a single set of flow and context data and would be performed for additional sets of flow and context data as they are stored in locations accessible to the anomaly detection engine. Process 900 begins by accessing (at 910) stored context data. In some embodiments, the stored context data is context data that has been correlated and aggregated by a context engine and stored in a contextual attribute storage. In some embodiments, the anomaly detection engine has a separate storage for context data that stores relevant data for stateful anomaly detection.

In addition to accessing (at 910) stored context data, the process 900 accesses (at 920) flow data. In some embodiments, the accessed data is from a flow group records storage storing aggregated flow group records. In some embodiments, the accessed data is flow identifiers and statistics for active flows stored in a flow identifier and statistics storage. In some embodiments, the anomaly detection engine has a separate storage for flow data that stores relevant data for stateful anomaly detection. One of ordinary skill in the art will appreciate that the different sets of stored data may be accessed in reverse order or in parallel and are described in the sequence above merely for the sake of convenience.

Once data has been accessed, the process 900 analyzes (at 930) the stored data to determine if an anomaly (anomalous behavior associated with a particular flow) is detected. In some embodiments, the analysis is stateful and takes into account past behavior (e.g., contextual attributes or collected statistics for previous flows). Such stateful analysis includes, in some embodiments, maintaining a mean value and standard deviation for certain statistics associated with flows that can be compared to current values of the statistics to determine if the current value represents anomalous behavior for the flow. The analysis, in some embodiments, additionally, or alternatively, includes stateless anomaly detection that looks at the flow and context data without considering past behavior of the specific flows. For example, the analysis may discover that a certain flow is using a certain port but that the context data associated with the flow indicates that the process using the port does not match to an expected process (or that the port does not match the process). One of ordinary skill in the art will appreciate that many other examples of stateful and stateless anomaly detection could be presented based on the types of data collected.

If the process 900 determines (at 930) that no anomaly was detected for the analyzed flow and context data, the process 900 ends. However, if the process 900 determines (at 930) that an anomaly was detected, the process 900 generates (at 940) an anomaly indicator. In some embodiments, the anomaly indicator is a flag bit that merely indicates that an anomaly was detected so that an analysis appliance that receives the flagged flow or context data will perform additional analysis based on the existence of the flag. In addition to, or in place of, the flag bit, some embodiments also generate an attribute value for specific types of detected anomalies (e.g., invalid, allowed to blocked flow, TCP sloppy, TCP incomplete, TCP zero window, application port mismatch, insecure app version, etc.).

Once the anomaly indicator has been generated (at 940), the process 900 stores (at 950) the generated indicator. In some embodiments, storing the indicator is done by providing the indicator to a context engine to correlate with the flow or other context data for storage in a contextual attribute data set. In other embodiments, the indicator is appended to the context data from which it was derived. The indicator, in some embodiments, is associated with the flow group record or flow data upon which the analysis was performed. After the indicator is stored (at 950), the indicator is published to the analysis appliance. In some embodiments, the publishing is performed as part of the publishing described above in relation to FIGS. 3 and 8

Figure 10:
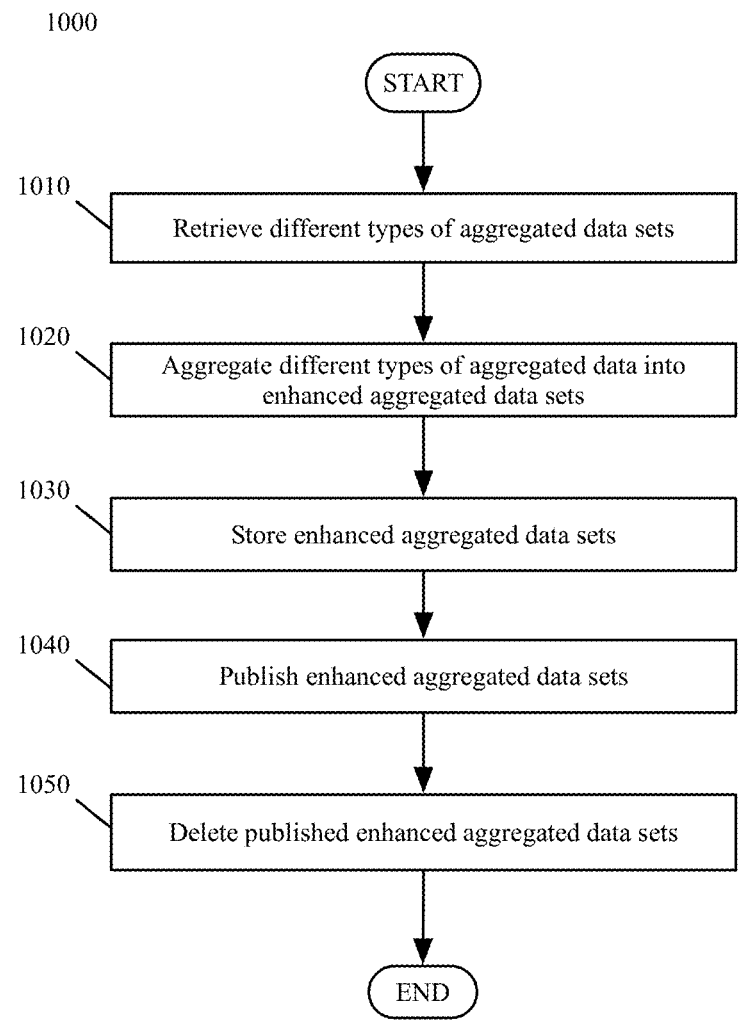
FIG. 10 conceptually illustrates a process for aggregating flow group records and contextual attributes into an enhanced aggregated data set.

To offload even more processing from the analysis appliance to the hosts, some embodiments, perform an additional correlation and aggregation process to produce enhanced flow group records that include related context data. FIG. 10 conceptually illustrates a process 1000 for aggregating flow group records and contextual attributes into an enhanced aggregated data set. In some embodiments process 1000 is performed by one of a context engine that aggregates context data, a flow aggregator that aggregates flow data, or a separate aggregation engine specifically for aggregating the context and flow data. In some embodiments, the process 1000 is initiated at the end of an aggregation period after collection and aggregation is performed to prepare aggregated datasets for publishing. Process 1000 begins by retrieving (at 1010) different types of aggregated data sets. In some embodiments, the different types of aggregated data sets are contextual attribute data sets stored in a contextual attribute storage and flow group records stored in a flow group record storage.

After retrieving (at 1010) the different types of data sets, the process 1000 aggregates (at 1020) the different types of data sets into enhanced aggregated data sets. In some embodiments, the enhanced aggregated data sets are a particular one of the retrieved data sets enhanced with data from the other type of data sets, while in other embodiments a new set of enhanced aggregated data sets is generated. For example, flow group records retrieved from the flow group record storage, in some embodiments, is enhanced with context data related to an attribute of the flow group record (e.g., an IP address, SID, port, etc.) such that all the contextual data relevant to the flow group record is appended to (or otherwise included) in an enhanced flow group record. In other embodiments, contextual attribute data sets have flow group records appended as additional attributes. In some embodiments, the enhanced aggregated data sets are the original data sets enhanced by an additional attribute (e.g., an index) that identifies related data sets of the different types of data sets. In some embodiments, the aggregation is based on attributes (e.g. IP address, SID, process hash) that appear in the different types of aggregated data sets.

Once the process 1000 aggregates (at 1020) the different types of data sets into enhanced aggregated data sets, the enhanced aggregated data sets are stored (at 1030). In some embodiments that append an attribute that identifies related data sets of the different types of data sets, the enhanced aggregated data sets are stored in the original storage elements. In other embodiments, one of the original storage elements is selected to store the enhanced aggregated data sets. A separate storage element is used, in some embodiments, to store the enhanced aggregated data sets.

After the enhanced aggregated data sets are stored (at 1030), the process 1000 publishes (at 1040) the enhanced aggregated data sets to an analysis appliance for further analysis and processing. In some embodiments, publishing the enhanced aggregated data sets includes publishing the enhanced aggregated data sets and receiving a confirmation that the enhanced aggregated data sets were received at the analysis appliance. The confirmation, in some embodiments, includes a checksum or other verification that the data was sent and received correctly. Once the data is published (at 1040) the enhanced aggregated data sets are deleted so as to clear memory space for the next set of enhanced aggregated data sets for a next publishing process.

Some embodiments provide an analysis appliance that receives the collected data (e.g., as separate flow group records and contextual attribute data) from the hosts as well as configuration data from a network manager computer. The analysis appliance, in some embodiments, is a server (or cluster of servers) that based on the received reports from each host computer and configuration data from the network manager computer, processes the data to be stored in a time series data storage, and performs analysis on the stored data. In some embodiments, the analysis appliance also provides access to the stored data to additional elements of the system for visualization and alternative analysis.

Figure 11:
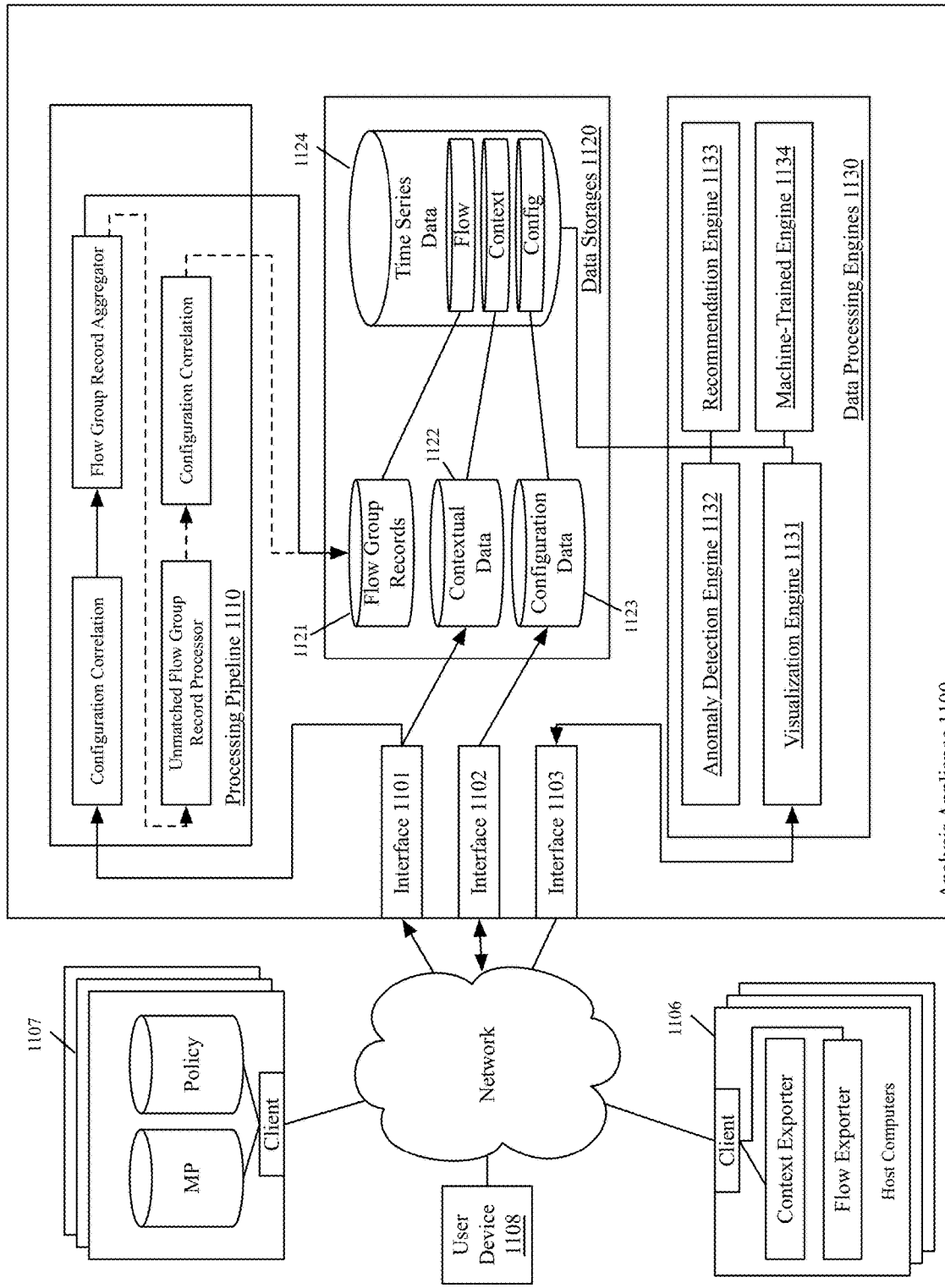
FIG. 11 illustrates an exemplary analysis appliance.

FIG. 11 illustrates an exemplary analysis appliance 1100. Analysis appliance 1100, in some embodiments, provides a set of interfaces 1101-03 for receiving data from the host computers 1106 and a set of network manager computers 1107 and for interacting with a user through a user interface 1108, respectively. The analysis appliance also includes, in some embodiments, a processing pipeline 1110 for flow data (e.g., flow group records received from host computers), a set of data storages 1120 for storing received data, and a set of data processing engines 1130 (e.g., visualization engine 1131, anomaly detection engine 1132, recommendation [generation] engine 1133, and machine-trained engine[/network] 1134).

Interfaces 1101-03, in some embodiments, are separate interfaces (e.g., ports, IP addresses, etc.) for interacting with the host computers 1106, network manager computers 1107, and user interfaces 1108. In some embodiments, interfaces 1101-03 are combined into a single interface through which the different elements of the system interact with the appliance. Interface 1101, in some embodiments, is used to receive both flow data and context data from the host computers. In some embodiments, interface 1101 is not used by the appliance 1100 for communicating to the host computers 1106. Instead, in some embodiments, the analysis appliance 1100 communicates control messages (e.g., updates to service rule policies, updated keys, updated group memberships validated by a user, etc.) through network manager computers 1107. Interface 1102 receives configuration data from the network manager 1107, in some embodiments. Interface 1102, in some embodiments, is used to receive both management plane configuration data and policy configuration data. In some embodiments, interface 1102 is also used to communicate with the hosts 1106 through the network management computer 1107. Interface 1103, in some embodiments, is used to receive key definitions, and commands for the visualization engine 1131 received from a user (e.g., through the GUI).

Figure 12:
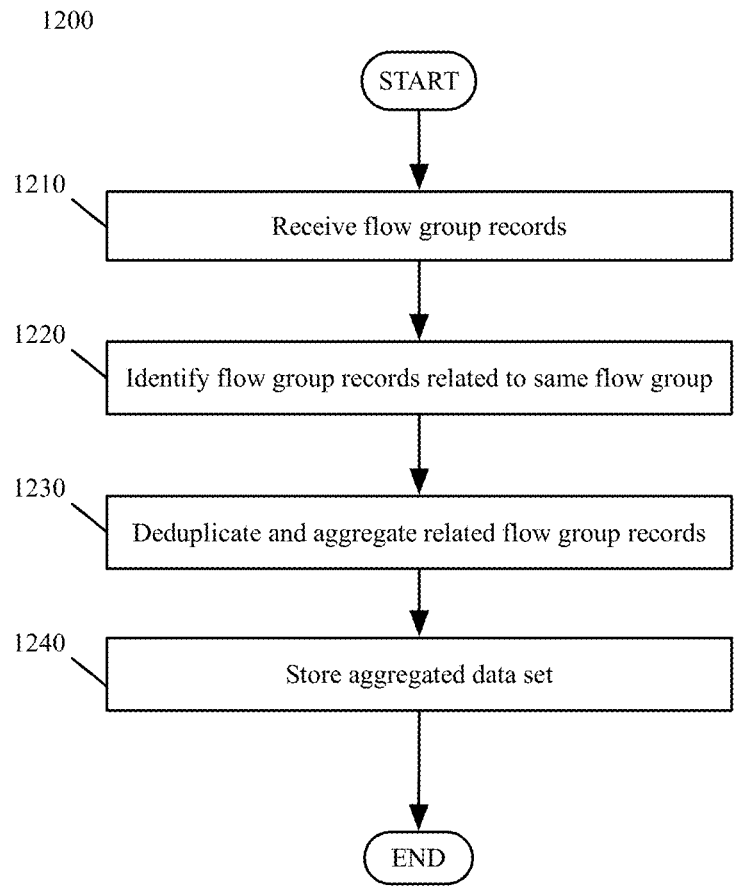
FIG. 12 conceptually illustrates a process that is performed as part of a processing pipeline of an analysis appliance in some embodiments.

Processing pipeline 1110, in some embodiments, processes flow data (e.g., flow group records) received from the host computers in the system for analysis by other elements of the appliance. FIG. 12 conceptually illustrates a process 1200 that is performed as part of processing pipeline 1110. Process 1200 is a first set of processing operations for processing flow group records received from the host computers. Process 1200 begins by receiving (at 1210) flow group records (e.g., attribute sets related to a flow group) from multiple host computers. The flow group records, in some embodiments, are duplicative flow group records that are received from different host computers along a datapath of at least one flow aggregated into the flow group record as described above in relation to FIGS. 4-8 (e.g., by using keys).

The process 1200 then identifies (at 1220) at least one set of at least two flow group records received from at least two host computers that relate to a same set of flows. In some embodiments, the same set of flows is a set of flows between a same set of source machines and a same set of destination machines. Two identified flow group records from two host computers, in some embodiments, relate to a same group of flows captured at a source and destination host computer. In such embodiments, the flow group records share a same set of key values (i.e., values in fields specified by a key used to generate the different flow group records) in the set of attributes.

Once the sets of related flow group records are identified (at 1220), the process 1200 deduplicates (and aggregates) (at 1230), for each set of identified set of related flow group records, the related flow group records. In some embodiments, the aggregation includes generating a new aggregated flow group record that is populated by including all the unique attribute values from the related flow group records. In some embodiments, the aggregation includes adding, to one flow group record, unique attribute values from each of the other identified related flow group records. For example, a host of a source machine includes a machine identifier for the source machine in a flow group record, while the host of a destination machine includes a machine identifier for the destination machine in a related flow group record. Thus, information missing from one flow group record, in some embodiments, is present in the related flow group record. The aggregation method, in some embodiments, depends on the attribute, with some attributes being concatenated, some attributes only keeping an extreme value (e.g. an earliest start time), and some embodiments keeping only unique values or other methods appropriate for specific attributes that will be appreciated by one of ordinary skill in the art based on discussions elsewhere in this document.

Once each set of identified flow record groups have been aggregated (at 1230), the process 1200 stores (at 1240) the deduplicated (and aggregated) flow group records for further processing (e.g., further deduplicating, correlation with configuration and context data, and analysis). In some embodiments, the data is stored in an intermediate data storage that is not the time series data storage. The intermediate data storage, in some embodiments, is a working memory. Process 1200, in some embodiments, is performed in conjunction with processes 1300, 1400, and 1500 discussed below in relation to FIGS. 13-15.

Figures 13, 14:
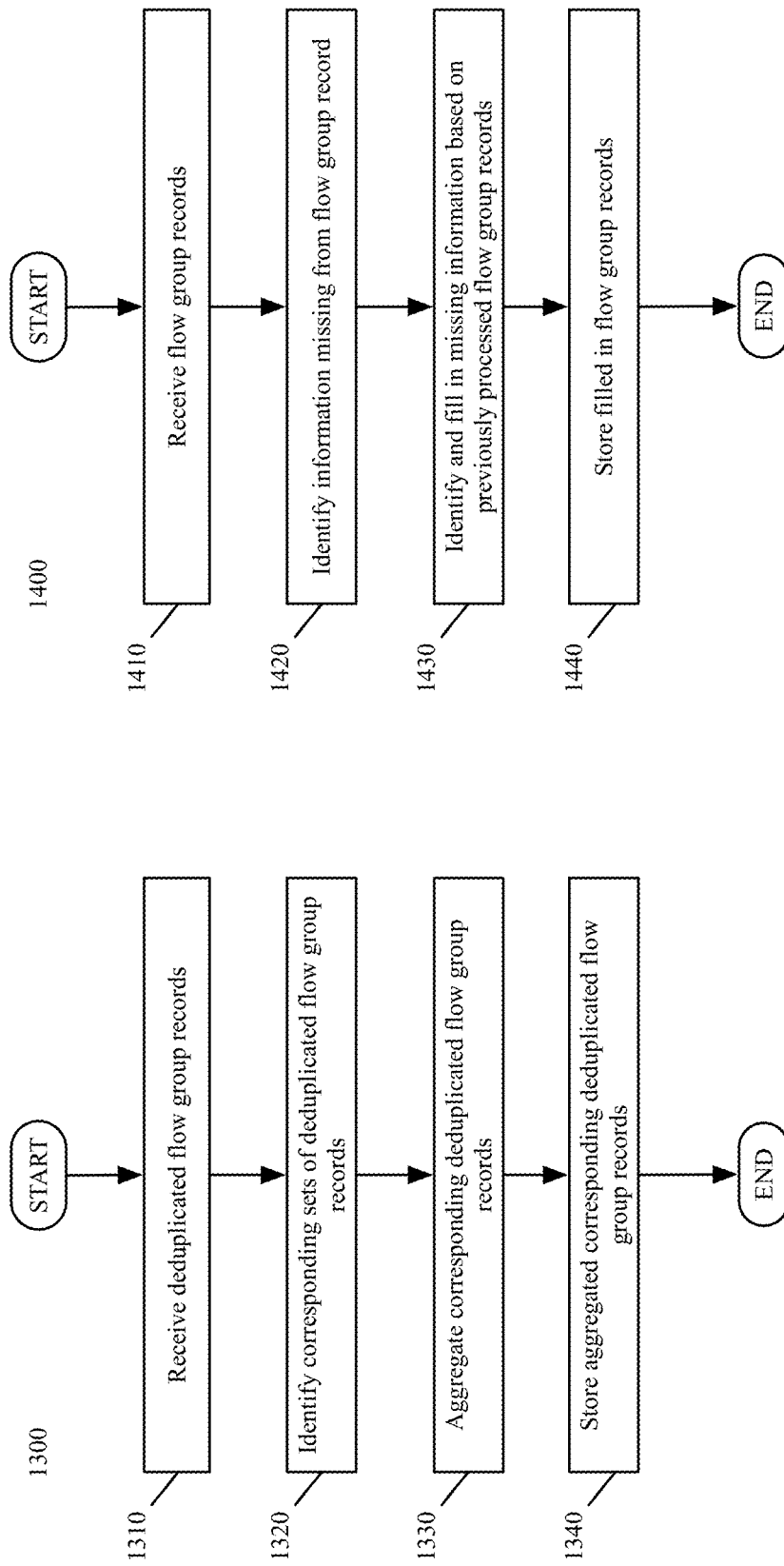
FIG. 13 conceptually illustrates a second process that is performed as part of a processing pipeline of an analysis appliance in some embodiments.
FIG. 14 conceptually illustrates a process for filling in missing information from flow record groups.

FIG. 13 conceptually illustrates a second process 1300 that is performed as part of processing pipeline 1110, in some embodiments. Process 1300 begins by receiving (at 1310) flow group records (e.g., attribute sets related to a flow group) from multiple host computers. The flow group records, in some embodiments, are duplicative flow group records that are received from different host computers along a datapath of at least one flow aggregated into the flow group record as described above in relation to FIGS. 4-8 (e.g., by using keys) and include the aggregated flow group records produced using process 1200.

The process 1300 then identifies (at 1320) at least one set of at least two flow group records based on flow group records received from at least two host computers that relate to a same set of flows (including, in some embodiments, the aggregated flow group records). In some embodiments, the same set of flows is a set of flows between a same set of source machines and a same set of destination machines. Two identified flow group records, in some embodiments, relate to related groups of flows going in different directions captured at a source and destination host computer. In such embodiments, the flow group records have a same set of key values (i.e., values in fields specified by a key used to generate the different flow group records), but have source and destination key values flipped in the set of attributes.

Once the sets of related flow group records (or deduplicated flow group records) are identified (at 1320), the process 1300 aggregates (at 1330), for each set of identified set of related flow group records, the related flow group records. In some embodiments, the aggregation includes generating a new combined flow group record that is populated by including all the unique attribute values from the related flow group records (after having flipped destination and source attributes). In some embodiments, the aggregation includes adding, to one flow group record, unique attribute values from each of the other identified related flow group records (after having flipped source and destination attribute values where appropriate). For example, if a first flow group record does not include source port data, the destination port data in the related flow group record is used to fill in the missing information for the first flow group record. In some embodiments, the aggregation includes discarding one of the flow group records because there is no additional information in the discarded flow group record. The aggregation method, in some embodiments, depends on the attribute, with some attributes being concatenated, some attributes only keeping an extreme value (e.g. an earliest start time), and some embodiments keeping only unique values or other methods appropriate for specific attributes that will be appreciated by one of ordinary skill in the art based on discussions elsewhere in this document.

Once each set of identified flow record groups have been aggregated (at 1330), the process 1300 stores (at 1340) the aggregated (and deduplicated) flow group records for further processing (e.g., correlation with configuration data, correlation with context data, and analysis). In some embodiments, the data is stored in an intermediate data storage that is not the time series data storage. The intermediate data storage, in some embodiments, is a working memory. Process 1300, in some embodiments, is performed in conjunction with process 1200 discussed above in relation to FIG. 12 and processes 1400 and 1500 described below in relation to FIGS. 14 and 15. In some embodiments, consistent source and destination addresses for data messages in both directions of a flow are determined based on a first data message sent from a source to a destination such that return data messages have their source and destination addresses flipped in order to be equivalent to the original data message. In such embodiments, the process 1300 is not necessary as process 1200 will associate both directions of the flows.

FIG. 14 conceptually illustrates a process 1400 for filling in missing information from flow record groups. In some embodiments, process 1400 is necessary for filling in information for flow group records that are not matched in either process 1200 or 1300 with a flow group record from a host computer hosting a destination machine such that a destination machine identifier (and, in some other embodiments, other destination-specific attributes) is not included in the unmatched flow group record. Process 1400 begins by receiving (at 1410) a set of flow group records. In some embodiments, the process 1400 receives flow group records that have not been matched through processes 1200 and 1300. In other embodiments, process 1400 is performed to fill in missing information for all flow group records.

The process 1400 then identifies (at 1420) information (e.g. an attribute value) that is missing from the flow group records (the unmatched flow group records or all received flow group records). The missing data, in some embodiments, is missing because each host has data for machines executing on the host but not for machines executing on other hosts and a flow that is blocked before exiting the host on which the source of the flow executes never reaches the destination host to have the destination machine identifier added to a flow group record that is reported to the analysis appliance. The fact that some data messages are blocked before exiting a source host computer is also the reason, in some embodiments, that the flow group record fails to match a flow group record from a second host computer as the second host computer never receives the data message to generate a flow group record based on the key values associated with the data message. In some embodiments, the missing information is a machine identifier for a destination machine.

After identifying (at 1420) the missing information, the process 1400 identifies (at 1430) the information that is used to fill in the missing information based on previously processed flow group records. In some embodiments, the missing information is a destination machine identifier and the analysis appliance maintains a list of learned IP address/machine identifier pairings based on the previously processed flow group records including the destination IP address and machine identifier for the destination IP Address. For example, at least one flow group record received from a host computer on which the destination machine executes includes a pairing of the destination IP address and the machine identifier associated with the destination IP address found in an unmatched flow group record. The pairing can then be used to fill in the missing destination machine identifier for the unmatched flow group record. Once the missing information is identified and filled in (at 1430), the process 1400 stores the filled in flow group records for further processing (e.g., correlation with configuration data, correlation with context data, and analysis). In some embodiments, the data is stored in an intermediate data storage that is not the time series data storage. The intermediate data storage, in some embodiments, is a working memory. Process 1400, in some embodiments, is performed in conjunction with, or after, processes 1200 and 1300 discussed above in relation to FIGS. 12 and 13 and process 1500 described below in relation to FIG. 15.

Figure 15:
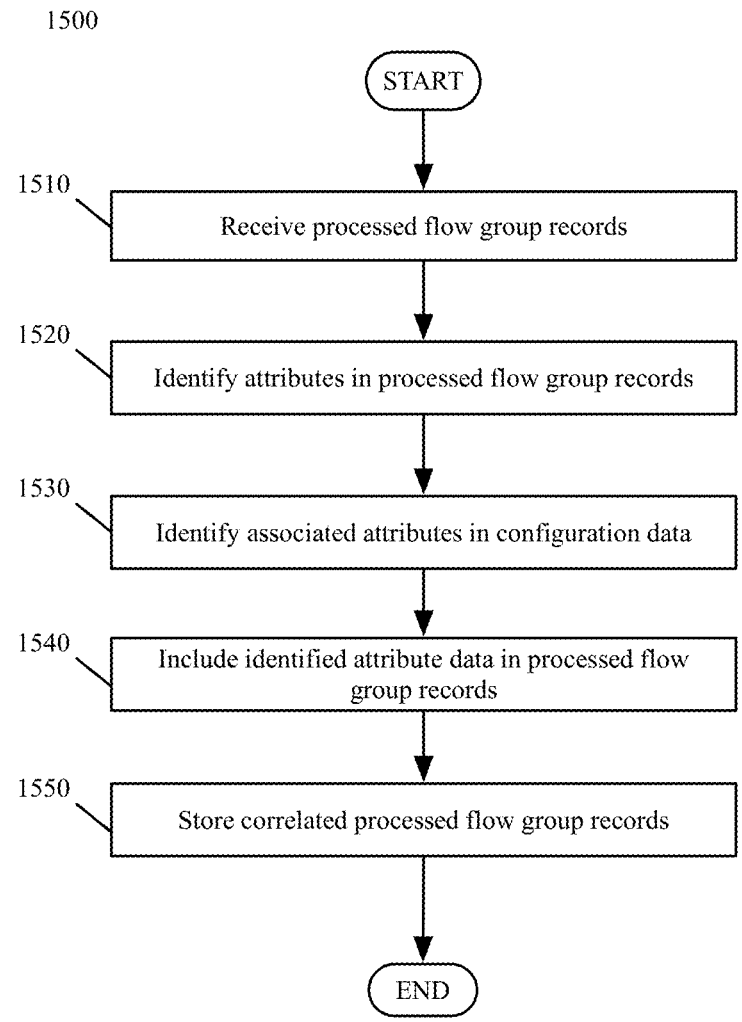
FIG. 15 conceptually illustrates a process for correlating flow group records received from host computers with configuration data received from a network manager computer.

FIG. 15 conceptually illustrates a process 1500 for correlating flow group records received from host computers with configuration data received from a network manager computer. In some embodiments, process 1500 is part of the processing pipeline 1110. Process 1500, in some embodiments, is performed before processes 1200, and 1300, while in others it is performed after processes 1200 and 1300 in order to reduce the number of flow group records that require correlation with the configuration data. In some embodiments, not all flow group records have corresponding flow group records received from other hosts. Process 1500 begins by receiving (at 1510) a set of flow group records. In some embodiments, the set of flow group records include any or all of the flow records received from the host computers, the aggregated flow group records produced by process 1200, and the aggregated flow group records produced by process 1300.

The process 1500 then identifies (at 1520) a set of attributes of the received flow group records that are used for correlating configuration data. The set of attributes, in some embodiments, includes any or all of a source machine identifier, a destination machine identifier, and a service rule identifier. In some embodiments, a configuration tag that identifies a configuration data set (or version) associated with the flow group record is identified for correlating configuration data with the flow group record.

Based on the identified set of attributes, the process 1500 identifies (at 1530) a matching set of attributes in at least one configuration data set. The matched set of attributes, in some embodiments, is associated with additional attributes in the configuration data set. For example, if a machine identifier is identified in a flow group record and a configuration data set, a group associated with the machine identifier is identified as an additional attribute. In some embodiments, the correct configuration data set to use from multiple received configuration data sets is identified by the configuration tag. A service rule identified as an attribute used for correlation, in some embodiments, is identified as a default rule based on the configuration data set. In some embodiments, the content of a service rule is identified for a service rule that is not a default rule. For example, a configuration data set identifies that a service rule identified in the flow group record applies to traffic from a particular source IP address, IP address range, or group(s) to a particular destination IP address, IP address range, or group(s).

After identifying (at 1530) the matching attributes in the configuration data set, the process 1500 adds (at 1540) configuration attributes associated with the matching attributes to the flow group records to complete the flow group record. In some embodiments, the added attributes are group identifiers that are related to a set of machine identifiers in the flow group record. The added attributes, in some embodiments, is a set of groups associated with a set of service rules in the flow group record. In some embodiments, both groups associated with machine groups and groups associated with service rules are added to the flow group records.

After adding (at 1540) the additional context data to the flow group records, the process 1500 stores (at 1550) the correlated flow group records to a data storage. In some embodiments, the data storage is a time series data storage. In some embodiments, the time series data storage is a topic-based data storage that maintains different topics for flow group records, configuration data sets, and contextual attribute data sets. In some embodiments, the records in the time series storage are associated with an index indicating a time position.

Figure 16:
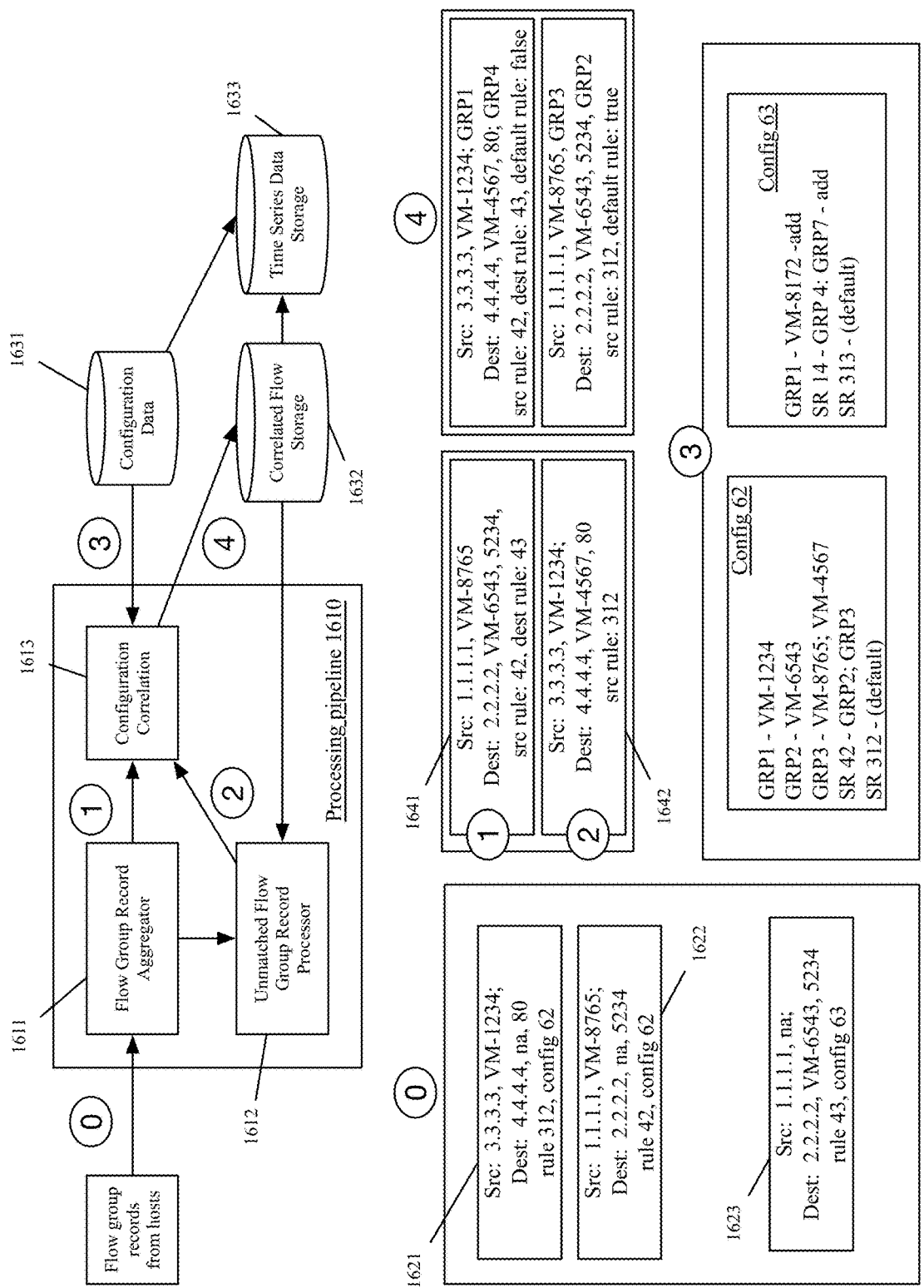
FIG. 16 illustrates a set of flow group records from two host computers being processed through an exemplary pipeline in one embodiment.

FIG. 11 illustrates a processing pipeline 1110 that performs process 1500 for correlating configuration data and process 1200 (and 1300 in some embodiments) for deduplicating flows. The processing pipeline 1110 then performs (for unmatched flows indicated by dashed lines) process 1400 for filling in missing machine identifiers and another round of process 1500 for correlating configuration data with the filled in data and provides the processed flow group records to a flow group records storage. FIG. 16 illustrates a set of flow group records from two host computers being processed through an exemplary processing pipeline 1610 (different from the processing pipeline 1110 illustrated in FIG. 11) in an embodiment in which source and destination addresses are consistent across host computers for a same flow as described above. The analysis appliance of FIG. 16 also includes configuration data storage 1631, correlated flow storage 1632, and time series data storage 1633 which will be discussed in further detail below. As shown, flow group records from a first host include a flow group record for a first flow which ignores source port. Flow group records from a second host computer include two flow groups, one for the same flow group as well as one for a different flow group that is unmatched in flow group records received from other host computers. The related flow group records are for a flow between a source machine having an IP address 1.1.1.1 and a machine identifier VM-8765 and a destination machine having IP address 2.2.2.2 and machine identifier VM-6543, the flow uses a destination port 5234 and a TCP protocol (not shown). The unrelated flow group record is for a flow from a source machine with IP address of 3.3.3.3 and machine identifier VM-1234 to a destination machine with an IP address 4.4.4.4 and an unknown machine identifier, the flow uses a destination port 80 and a TCP protocol (not shown).

In the example, it is assumed that a previous flow group record including a machine identifier for IP address 4.4.4.4 was previously processed by the flow pipeline. The flow group records are received by the processing pipeline 1610 as flow group records "0", shown including flow group records 1621-23. In the depicted embodiment, a first aggregation process (as in process 1200) is performed by flow group record aggregator 1611 that aggregates related flow group records. The aggregated flow group record "1" is a single flow group record 1641 that includes all the information of flow group records 1622 and 1623.

Any flow group record for which a related flow group record was not found (e.g., flow group record 1621) is then passed in its original form to unmatched flow group record processor 1612 for unmatched flow group record processor 1612 to fill in missing attribute information (e.g., according to process 1400). To do this, unmatched flow group record processor 1612 accesses the correlated flow storage 1632 to identify, for example, a missing machine identifier (e.g., VM-4567) for an IP address (e.g., 4.4.4.4). The processed flow group record "2" (e.g. flow 1642) now includes missing machine identifiers (and any other information supplied from learning processes based on the correlated flow storage data).

After processing received flow group records, each of flow group record aggregator 1611 and unmatched flow group record processor 1612 provides the processed flow group records (e.g., "1" and "2") to configuration correlator 1613 for correlation with configuration data sets. In the depicted embodiment, the flow group records include a configuration tag identifying a relevant configuration data set for the flow group record. Configuration tags, in some embodiments, are different for flow record groups received during a same time period (e.g., an aggregation time), while in some embodiments, the configuration tags for flow group records received during a same time period are the same. For flow group records 1621 and 1622, the host computer was running a configuration version 62, while the host computer that sent flow group record 1623 is running a configuration version 63. Configuration correlator 1613, in this embodiment, adds group attributes (e.g. a default service rule attribute indicating whether a default service rule was hit by the flows in the flow group record) based on machine identifiers and service rules. The configuration data, "3", includes configuration data "config 62" and "config 63" that indicate group memberships, service rule groups, and a default service rule. Config 62 is represented as including information for processing flow group records 1621-1623, and config 63 is shown as an update to config 62 (e.g., a delta) that includes machines and service rules (SRs) added since the configuration corresponding to config 62. It is understood by one of ordinary skill in the art that the configuration data includes additional data that is not shown as it is irrelevant to flow group records 1621-1623. Once the attributes are added, the processed flow group records "4" are provided to correlated flow storage 1632 to be subsequently stored in time series data storage 1633.

Returning to the discussion of FIG. 11, The data storages 1120 include, in some embodiments, a data storage for each different type of data received (e.g., a correlated flow group record data storage 1121, a contextual attribute data storage 1122, a configuration data storage 1123, and a time series data storage 1124). The contextual attribute data storage 1122, in some embodiments, stores received contextual attribute data from multiple host computers and uses that data for populating the time series data storage 1124 with contextual attribute data (e.g., in a contextual attribute topic). In some embodiments, the contextual attribute data storage 1122 is used in correlating contextual attributes with flow group records for display. The time series data storage 1124 is used additionally, or alternatively, in other embodiments, for correlating contextual attribute data to flow group record data.

The contextual attribute data storage 1122, in some embodiments, receives contextual attribute data sets including any, or all, of: data regarding guest metadata, guest events, and guest DCN metrics. In some embodiments, the guest metadata includes any or all of DCN details (a universally unique identifier [uuid], a bios uuid and a vmxpath), operating system details (type of OS and version information), and process details (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. One of ordinary skill in the art will appreciate that many additional pieces of information may be provided to a contextual attribute data storage and that the partial list above serves only as an example.

In some embodiments, the set of data storages 1120 includes a correlated flow group record data storage 1121. As described above in relation to FIG. 16, a correlated flow group record data storage 1121, in some embodiments, stores flow group records after aggregation and correlation with configuration data stored in a configuration data storage 1123. The correlated flow group record data storage 1121, in some embodiments, also stores learned pairings of IP addresses and machine identifiers. In some embodiments, the learning is based on previously processed flow record groups. The correlated flow group record data storage 1121, in some embodiments, provides processed (e.g., aggregated and correlated) flow group records to the time series data storage.

A configuration data storage 1123, in some embodiments, receives configuration data from a network manager controller. In some embodiments, the configuration data includes configuration data sets sent from a management plane (MP) configuration storage and a policy configuration storage on a network manager computer 1107 that are merged before or after being sent from the network manager computer. The management plane configuration data sets include information relating to group membership (in terms of machines), and the policy configuration data sets include information about service rules (e.g., firewall rules), in some embodiments. The service rules, in some embodiments, are expressed in terms of any of IP addresses, ports, protocols, groups, etc., in any combination. In some embodiments, an initial set of configuration data is sent at startup or reboot of either the network manager computer or the analysis appliance, while subsequent configuration data sets include only changes to the last configuration data set.

A time series data storage 1124, in some embodiments, stores flow group records, configuration data, and context data. In some embodiments, the time series data storage 1124 is organized by topic with each different type of data stored in a different topic. Additionally, in some embodiments, each topic is organized in a time series fashion by use of an index that is appended to each set of data and is coordinated among all the producers of data for the topic. The time series data storage 1124 is organized at a plurality of levels of temporal granularity, in some embodiments. In some embodiments, the different levels of granularity include some combination of hourly, daily, weekly, and monthly. The different levels of temporal granularity are used, in some embodiments, for data collected for a previous 24 hours (e.g., organized on an hourly basis), data for a previous 6 days (e.g., organized on a daily basis), data for a previous 30 days (e.g., organized on a daily or weekly basis), and data received more than 30 days earlier (e.g., organized on a monthly basis). The data organized based on the various levels of temporal granularity are, in some embodiments, periodically (e.g., daily) rolled up into the next level of granularity.

Figure 17:
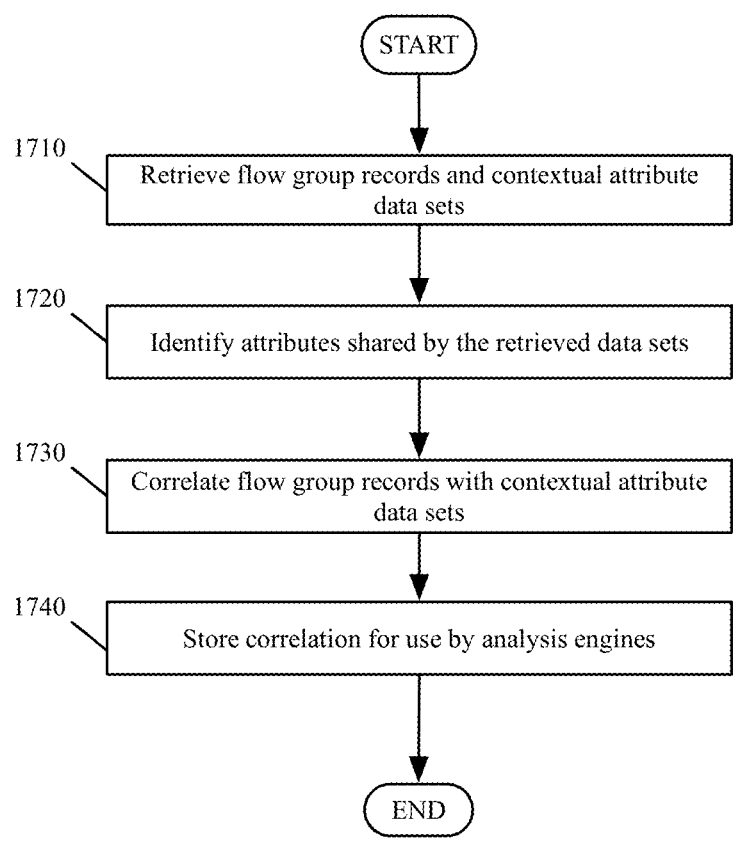
FIG. 17 conceptually illustrates a process for correlating contextual attribute data sets with flow group records.

Some embodiments provide contextual attribute data correlation that is used in multiple analysis engines discussed below. FIG. 17 conceptually illustrates process 1700 for correlating contextual attribute data sets with flow group records. Process 1700 is performed, in some embodiments, by each analysis engine to correlate and collect relevant attributes, while in other embodiments a shared correlation engine is used by each analysis engine. Process 1700 begins by retrieving (at 1710) the flow group records and contextual data attribute sets for correlation. In some embodiments, the data is retrieved from at least one of (1) a contextual attribute data storage and a correlated flow group record data storage and (2) a time series data storage (storing both flow group records and contextual attribute data sets).

After retrieving (at 1710) the data sets for correlation, the process 1700 identifies (at 1720) shared attributes that appear in both sets of data. The shared data attributes, in some embodiments, include IP addresses, listening ports, machine identifiers, etc., that can be used to correlate the flow group records with contextual attribute data sets. The identified attributes are then used to correlate (at 1730) the flow group records and the contextual attribute data sets. In some embodiments, the correlation includes adding selected (e.g., configurable) attributes from the contextual attribute data set to the flow group records. In some embodiments, each record in the different sets of data is tagged by an index to ease future analysis operations that require correlated data. In other embodiments, the correlation is performed each time an analysis operation is performed because the analysis is generally performed only once per related data sets.

Once the data sets are correlated (at 1730), the process 1700 stores (at 1740) the correlated data for use by the analysis engines. In some embodiments, the storage is a temporary storage that is deleted after the analysis engines have completed their analyses. In other embodiments, the correlated data is stored in the time series data storage in the form of additional attributes stored in the flow group records and contextual attribute data sets as described above for additional future access.

Anomaly detection engine 1132, in some embodiments, performs anomaly detection based on sets of attributes received from host computers. Anomaly detection engine 1132, in some embodiments, analyzes the incoming flow data to detect anomalous behavior. The analysis, in some embodiments, is performed after a deduplication/aggregation operation on the flow group records stored in one (or both) of the correlated flow group record storage and the time series data storage. In some embodiments, the analysis identifies flows for further investigation by an administrator.

In some embodiments, a set of flow group records include an indication of anomalous behavior that is used to select flow group records for further anomalous behavior analysis. In some embodiments, the anomalous behavior indication is a flag bit that indicates anomalous behavior detection at a host computer. The anomalous behavior indication, in other embodiments, is provided as a value that indicates a type of anomalous behavior detected. The various types of anomalous behavior include, in some embodiments, one of: (1) an indication that a newly added service rule was not used to process at least one flow in the particular group of flows to which the newly added service rule applies, (2) that a default service rule was used to process at least one flow in the particular group of flows, (3) that at least one source machine of a flow in a particular group of flows has not been microsegmented, (4) that no service rule has been specified for communications between source and destination machine of at least one flow in the particular group of flows, (5) that a port associated with at least one flow in the particular group of flows does not match a port expected based on an application associated with the at least one flow, (6) that a previously blocked flow has been allowed, (7) that an insecure version of an application has been used, (8) that an application or URL related to a flow group record has a bad reputation score, and (9) that an irregularity was detected with a protocol (e.g., TCP) header. Additional types of anomalous behavior that are provided, in some embodiments, will be appreciated by one of ordinary skill in the art.

The analysis, in some embodiments is also performed based on other received data sets (e.g., contextual attribute data sets and configuration data sets that, in some embodiments, have already been correlated with the flow group records), stored flow group records from the time series data storage, or any combination of the above. The contextual attribute data sets, in some embodiments include attributes that are not found in headers (layer 2-layer 4) of data messages. For example, process identifiers, process hashes, CPU and memory usage, and other contextual attributes discussed above. In some embodiments, the configuration data is used to identify service rules in effect at the time the flows were collected. The analysis, in some embodiments, includes at least one of identifying flows that appear to break service rules identified from the configuration data and identifying large amounts of data exchanged between two machines (e.g., as an FTP put or an HTTP POST). The result of the analysis, in some embodiments, is an alert regarding the anomalous behavior to an administrator.

Figure 18:
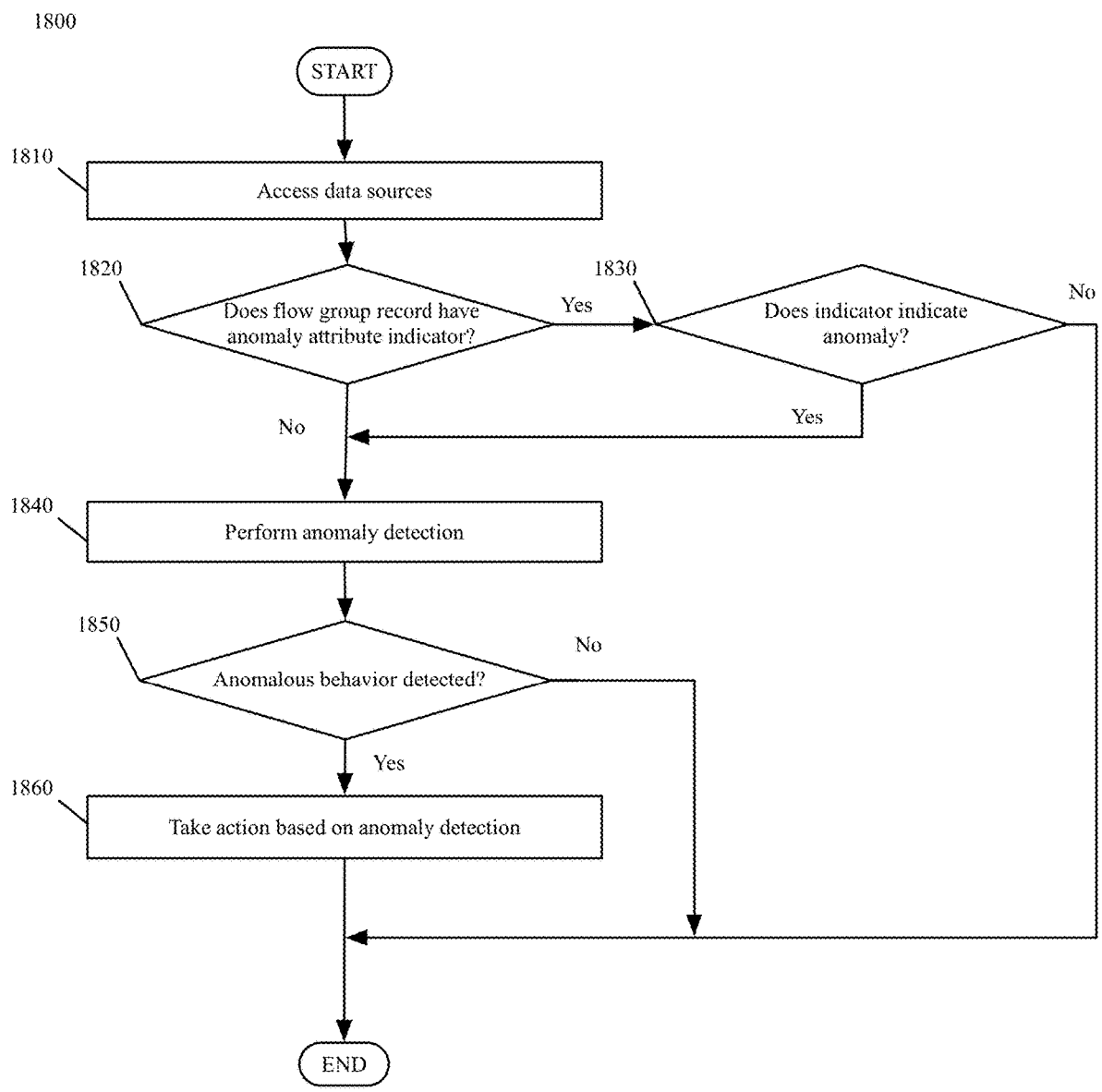
FIG. 18 conceptually illustrates a process for detecting anomalous behavior associated with flow group records.

FIG. 18 conceptually illustrates process 1800 for detecting anomalous behavior associated with flow group records. In some embodiments, process 1800 is performed by an anomaly detection engine of the analysis appliance. Process 1800, in some embodiments, represents an anomaly detection process for a single set of data related to a single flow and is performed for additional sets of data for additional flows as they are stored by the analysis appliance for access by the anomaly detection engine (among other analysis engines). Process 1800 begins by accessing (at 1810) data sources used in anomaly detection. In some embodiments, the data sources include any of the following sources, singly or in combination: the correlated flow group record storage, the contextual attribute storage, the configuration data storage, and the time series data storage. In some embodiments, the data sources have gone through a correlation process as described in relation to FIGS. 15 and 17 above.

Once the process 1800 accesses (at 1810) the data sources, the process 1800 determines (at 1820) if the stored group records include an anomaly detection attribute. In some embodiments, the anomaly detection attribute is included in a flow group record received from a host computer. The anomaly detection attribute generation and insertion are described above in relation to FIG. 9 above. If the process 1800 determines (at 1820) that the flow group record does include an anomaly detection attribute, the process 1800 determines (at 1830) whether the anomaly detection attribute indicates anomaly detection at the host computer. If the anomaly attribute does not indicate an anomaly, some embodiments end the processing of the data set (as shown). Other embodiments perform additional anomaly detection described below using data that is not used at the host computer to detect anomalous behavior wherein steps 1820 and 1830 are skipped and the anomaly indicator provided by the host computer is used to confirm or reject the specific anomalous behavior indicated.

If the process 1800 determines (at 1820) that the flow group record does not include an anomaly detection attribute, or the process 1800 determines (at 1830) that the anomaly detection attribute indicates anomalous behavior, the process 1800 performs (at 1840) anomaly detection. In some embodiments, the anomaly detection determines different types of anomalous behavior based on different data sets. For example, flow group records are used to determine if an amount of data exchanged for a particular flow group record is abnormally large. In some embodiments, the determination that the amount of data is abnormal is based on previously collected flow group records for the flow group record being analyzed. Other embodiments use flow group records and contextual attribute data to determine that a particular application is used that does not match a port indicated in the flow group record, or that an application version associated with the flow group record is not a secure version. Other types of anomalies, in some embodiments, are detected based on the rich contextual attributes (e.g., contextual attributes in addition to L2-L7 header values as described above in relation to collecting contextual attribute data) collected from the host computers (e.g., from guest introspection agents on the host computers). Other examples of anomalous behavior detection will be understood by one of ordinary skill in the art.

Once the anomaly detection has been performed (at 1840), the process 1800 determines (at 1850) whether any anomalous behaviors have been detected. If an anomalous behavior has been detected (at 1850), an action is taken (at 1860). In some embodiments, the action is storing an indication of the anomalous behavior for presentation to a user. In other embodiments, certain types of anomalies trigger specific remedial action (e.g., generating service rules to block flows related to the anomalous behavior until reviewed by an administrator) in addition to presenting an indication of the detected anomalous behavior. Once the action has been taken (at 1860), or if the process 1800 had determined (at 1850) that there was no anomalous behavior detected, the process 1800 ends. In some embodiments, the anomaly detection process 1800 is periodically or continually performed as a background process, while in other embodiments anomaly detection is performed upon a user request made through a UI of the analysis appliance.

Some embodiments also provide a recommendation engine to produce recommendations for an administrator. The recommendation engine, in some embodiments, provides data for machine learning and uses machine-trained networks to make recommendations. In some embodiments, the recommendations include a group to which a particular machine should be added, a new group that should be created for a particular set of machines, or a set of service rules (e.g., firewall rules) based on existing groups and data messages detected (e.g., unmicrosegmented data flows). In some embodiments, the recommendation engine identifies unmicrosegmented machines and suggests specific service rules for microsegmentation or makes a general recommendation that microsegmentation may be desirable to an administrator among a set of machines.

Figure 19:
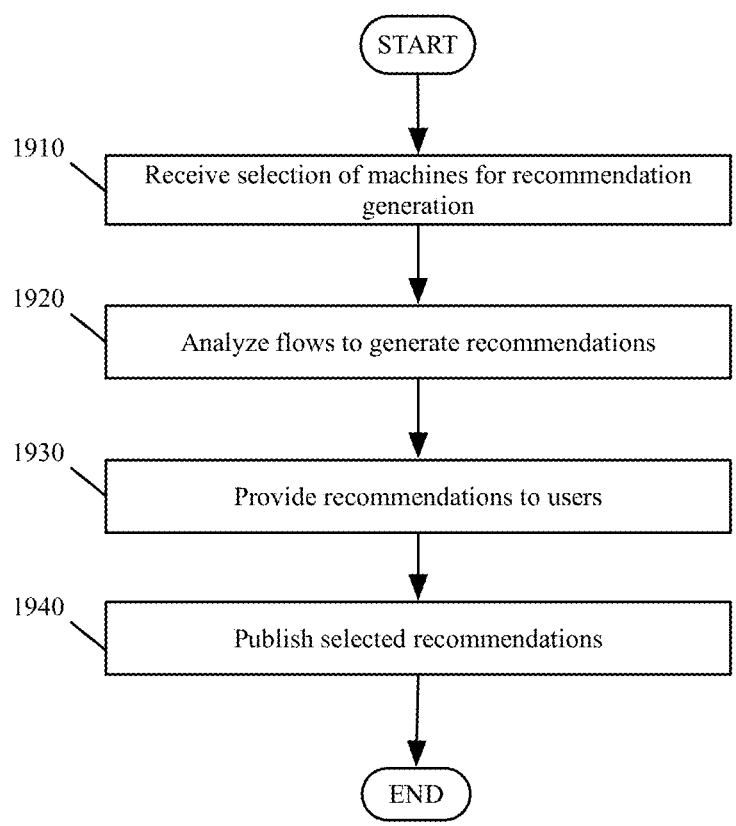
FIG. 19 conceptually illustrates a process for performing service rule recommendation generation.

FIG. 19 conceptually illustrates process 1900 for performing service rule recommendation generation. In some embodiments, the recommendation engine (e.g., recommendation engine 1133) performs the recommendation generation process 1900. In some embodiments, a recommendation engine employs a machine-trained network (e.g., machine-trained engine 1134) to perform analysis used in making the recommendation. Process 1900 begins by receiving (at 1910) a selection of machines for recommendation generation. In some embodiments, the selection is received from a user through a user interface. In some embodiments, the selection is for all machines, while in others the selection is of a subset of machines.

After the machines are selected (at 1910), the process 1900 analyzes (at 1920) the flows to generate recommendations. In some embodiments, the analysis begins by determining groupings of machines. The determination of groupings of machines, in some embodiments, is based on a machine-trained network or some other form of machine learning. In some embodiments, the grouping of machines is based on rich contextual data (e.g., contextual data that includes more than the L2-L7 header values of flows gathered as described above) related to the machines and the flow group records (including, for example, user sid, process hash, URLs, appId, etc.) associated with the machines. In other embodiments, the groupings of machines are received from a user. Some embodiments identify groupings of machines for any selected machines not already placed in a group by a user.

Once groupings are identified, the analysis continues by identifying flows between different machines. The identified flows, in some embodiments, include blocked and allowed flows. In some embodiments, allowed flows are ignored unless an anomaly detection process (e.g., process 1800) detects anomalous behavior associated with an allowed flow. Blocked flows, in some embodiments, are flows that hit a default rule that specifies a blocking or dropping action. A flow that hits a default rule indicates that no microsegmentation has been implemented between the source and destination machines (or groups to which the machines belong).

Based on the identified groups and flows, the process 1900 generates service rule (e.g. firewall rule) recommendations. In some embodiments, the rule generator is a lookup table that is indexed by values identified in the flow headers or group identifiers. Based on the flow and group identifiers, the lookup table identifies a set of possible rules for recommendation. For allowed flows that have been identified as exhibiting anomalous behavior, the rule generation, in some embodiments, includes generating a recommended rule that blocks the flow. For flows that hit a default service rule, some embodiments generate recommended rules that are specified at different levels of specificity. For example, a first (broadest) generated recommendation specifies only source and destination IP addresses identified in the flow, a second (narrower) generated recommendation specifies source and destination IP addresses identified in the flow as well as L4 or L7 attributes, and a third (narrowest) generated recommendation specifies source and destination IP addresses identified in the flow as well as L4 and L7 attributes and additional contextual data (e.g., group identifiers, process hash, etc.) in an associated contextual attribute data set. In some embodiments, the generated recommendations are whitelist service rules, while in other embodiments, the generated recommendations include both whitelist (allow) and blacklist (block) recommendations. In some embodiments, recommendation generation is done by an Apache™ Spark™ process running in a background, that runs only upon a user request. In other embodiments, a user can institute periodic or continuous service rule recommendation as long as they are willing to pay for the extra processing power required.

After the recommendations are generated (at 1920), the process 1900 provides (at 1930) the generated recommendations to the user for review. The recommendations, in some embodiments, are provided in a graphical user interface (GUI) (such as is described below in FIG. 20). The GUI, in some embodiments, includes different selectable tabs to review the recommended service rules and machine groupings that were identified in the process of generating the rules. In some embodiments, the GUI allows the user to review the recommendations, select a set of recommendations, and publish the recommendations to a service engine for application.

Once the user selects a set of recommended service rules and selects to publish them, the process 1900 publishes (at 1940) the selected recommended service rules. In some embodiments, publishing service rules to service engines includes communicating with a network manager computer to update a policy configuration and push the published rules to service engines executing on the host computers.

Figure 20:
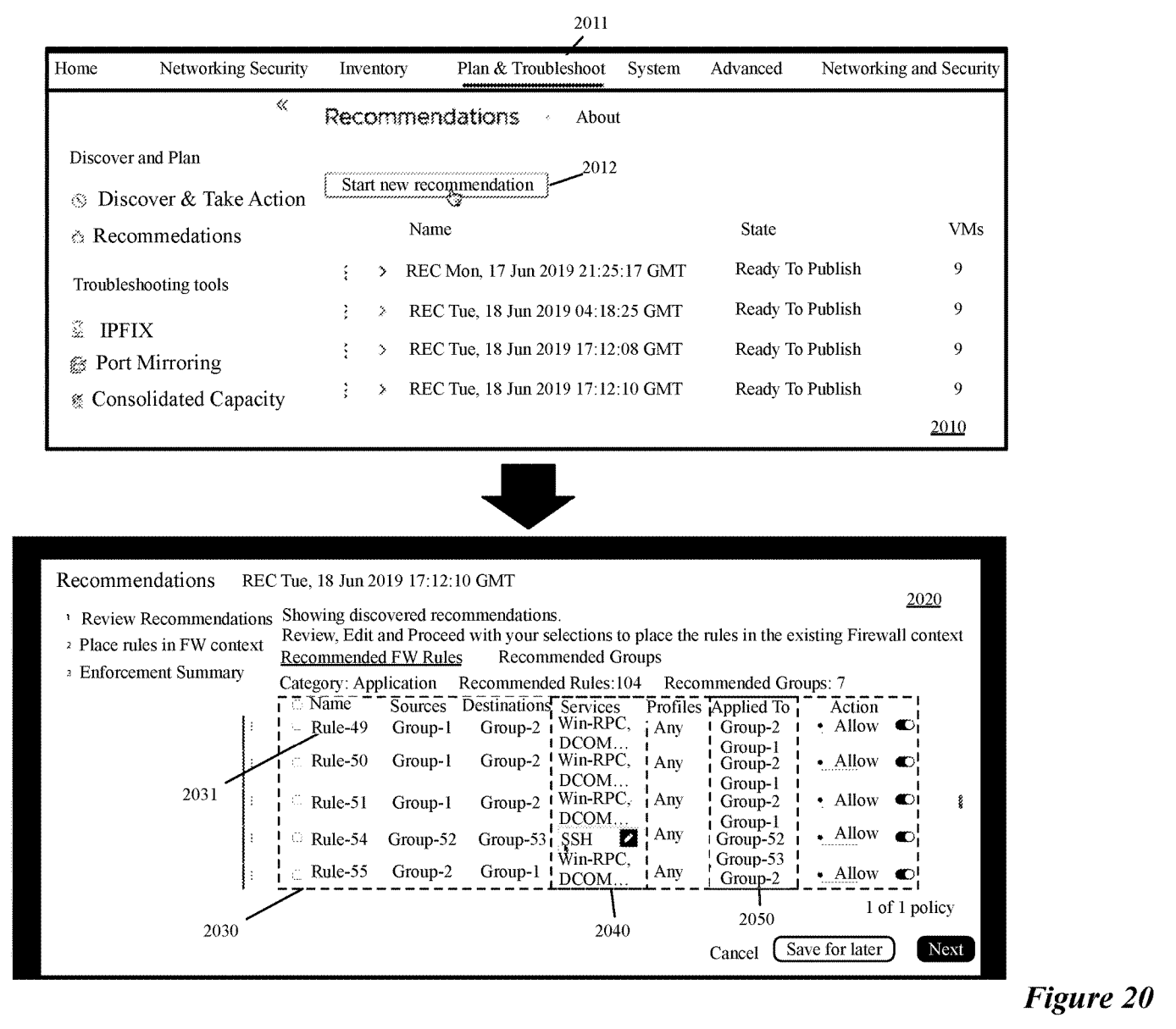

FIG. 20 illustrates an embodiment of a user interface for generating and publishing service rule recommendations. A first display provided by the UI 2010 is shown after having selected a planning and troubleshooting tab 2011 that offers a selectable element for initiating a new recommendation (i.e., "start new recommendation" selectable element 2012). Display 2010 also includes a set of previous recommendations. Not shown is a previously displayed menu to select the machines to include in the recommendation. If a user selects the element 2012 for initiating a new recommendation, the process for generating recommendations (e.g., process 1900) begins.

Display 2020 illustrates an embodiment of a set of recommendations 2030 for a set of machines belonging to different groups 2050 and including different layer 4 attributes 2040. Display 2020 also includes a radio element (e.g., radio element 2031) for each recommended rule that can be selected or deselected to include or exclude the rule when publishing the set of service rules. Once the desired rules are selected, the selected rules can be published to be included in a particular set of service rules.

In some embodiments, a visualization engine is provided to present a visual representation of machines as members of groups and to represent communications between machines. The visualization processing, in some embodiments, also includes generating a graphical user interface that can be used to select groups of machines, domains, or individual machines and display contextual attributes relevant to the selected group, domain, or machine. In some embodiments, the context data is displayed based on a mouse-over (e.g., hover) operation in which a mouse (e.g., pointer) is moved over a machine, domain, or group to select it for display of contextual attributes which triggers a window to appear over the previous graphical representation with the contextual attributes displayed in the window. In some embodiments, flows between machines are also presented visually and can be selected or a mouse-over can be used to display additional contextual attributes of a selected flow. Other display options (e.g., lists, tables, etc.) are used in addition to or in place of the described mouse over.

In some embodiments, the visualization engine includes a pipeline for determining a current configuration for a displayed collection period based on a current configuration of a previous period and updated configuration data sets received as changes to a configuration set. A first module of the pipeline, in some embodiments, accepts as input a configuration for an immediately previous display time period and additional configuration data sets that indicate a set of changes to the configuration for the immediately previous display time period. In some embodiments, the time period is a configurable parameter selected by a consumer of the visualization (e.g., the user). The pipeline combines the configuration data sets and indicates, in some embodiments, not only the current configuration but also the changes from the previously displayed configuration. In some embodiments, the changes are changes to group memberships and rules that apply to communications between different groups.

In some embodiments, the visualization engine includes a parallel pipeline for receiving flow data (e.g., flow group records) and incorporating them into the visualization. Based on the two sets of data, a set of graphs is generated, in some embodiments, that includes a full view of the machines and their connections and a view of the groups and their connections. In some embodiments the full view of the machines is a display of the graph in a canvas (e.g., bitmap) format that displays connected machines as spatially separate groups of connected nodes. The display switches from a canvas-based display to a scalable vector graphics (SVG) display, in some embodiments, as a user zooms in on smaller portions of the graph for which SVG performs better. In some embodiments, certain views are generated as a combination of canvas elements and SVG elements (e.g., nodes being SVG objects and flows being canvas objects or vice versa).

Figure 21A:
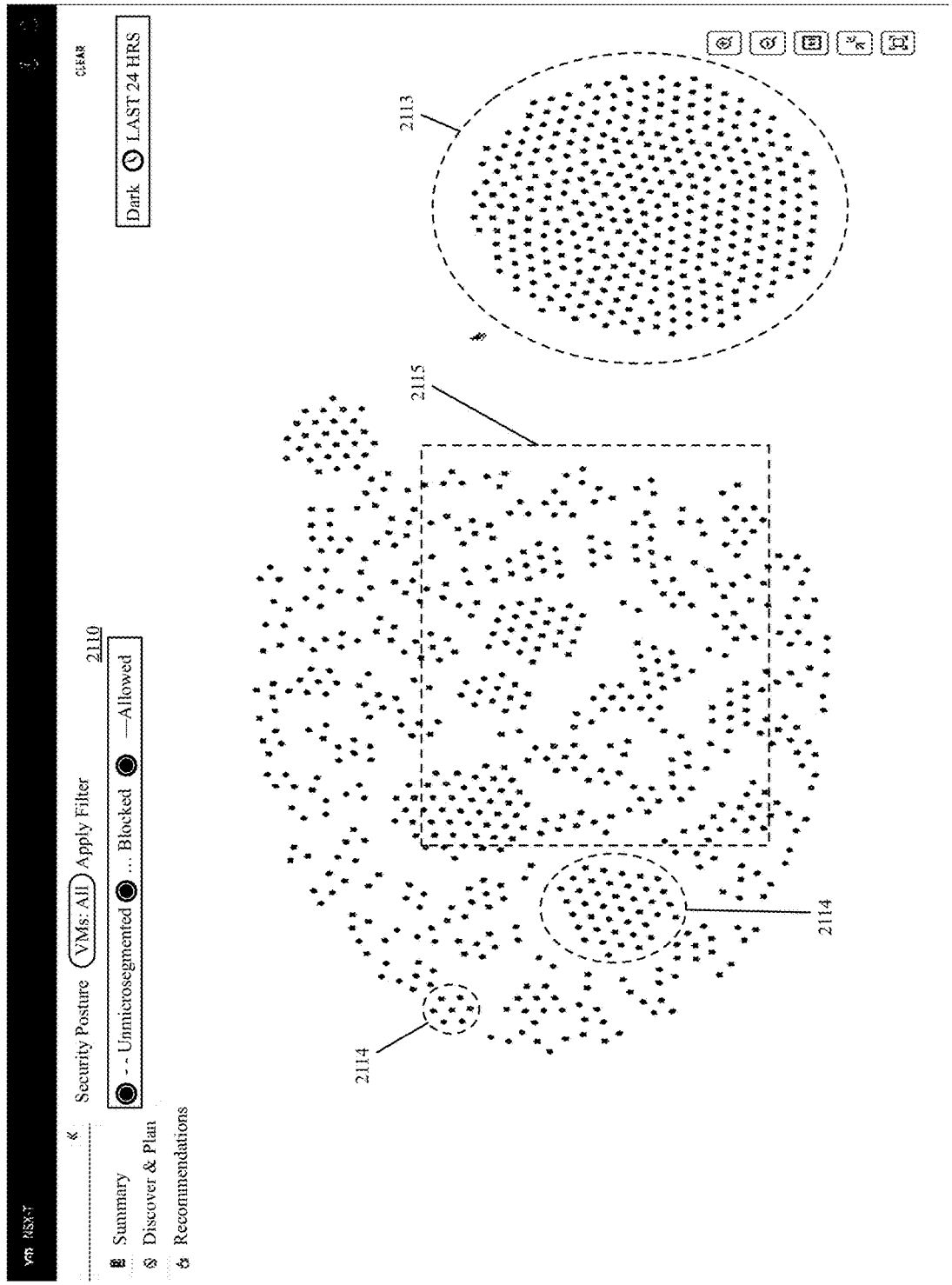
FIGS. 21A-C illustrate views of a set of machines beginning from a view of the whole network and providing two additional views at different levels of zoom.
Figure 21B:
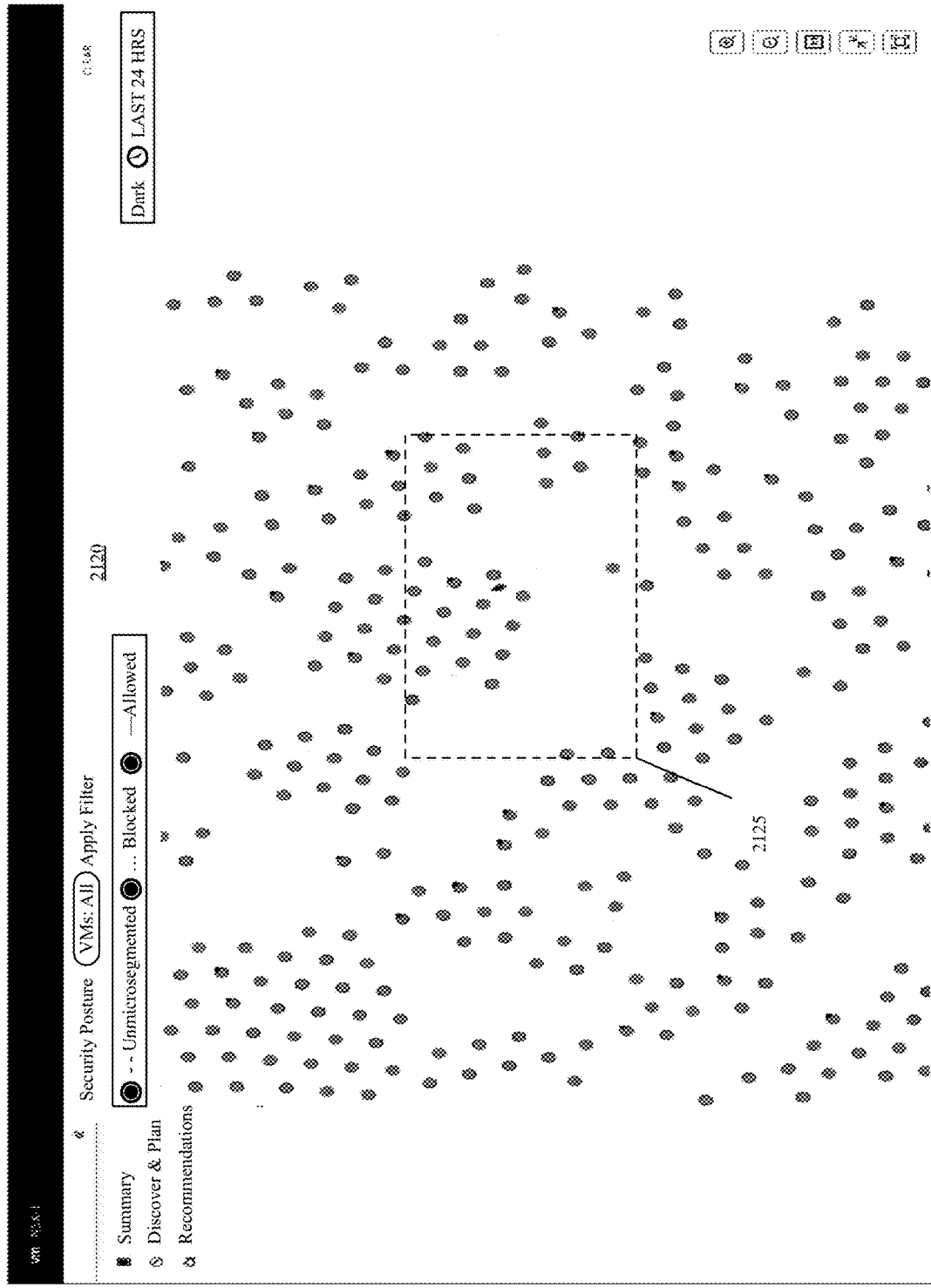
Figure 21C:
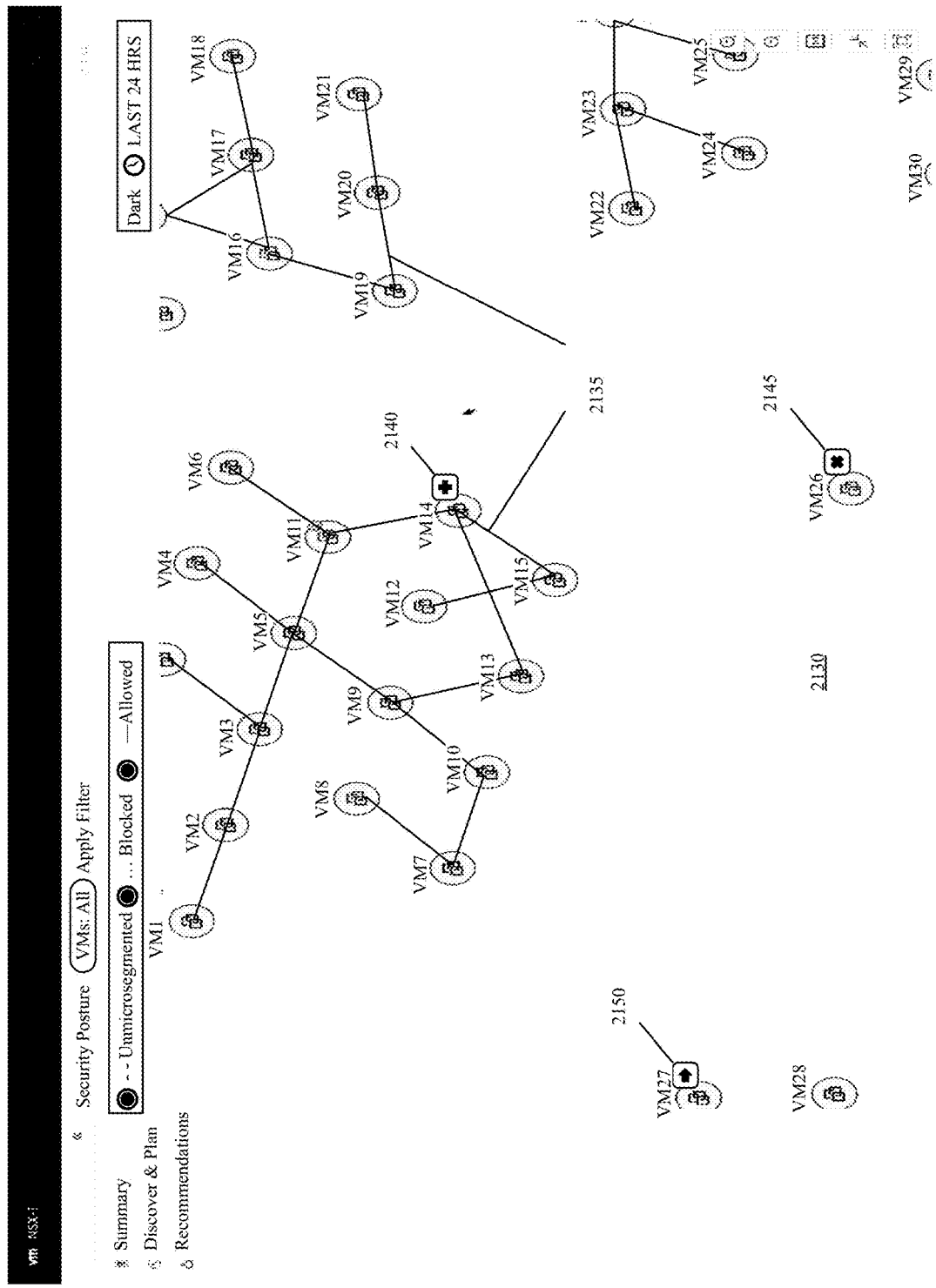

In some embodiments, multiple types of views are made available to a user through a set of selectable elements of a visual display. The multiple types of views, in some embodiments, include a machine based view, a group based view, and a machine based view with displayed machines selected based on a group selection. FIGS. 21 and 22 illustrate embodiments of these different views. FIGS. 21A-C illustrate views of a set of machines beginning from a view of the whole network and providing two additional views at different levels of zoom.

FIG. 21A illustrates a machine based view that indicates groupings of machines based on existing connections (or the lack thereof). In display 2110 all the machines are displayed, with unconnected machines depicted in area 2113 to separate them from connected machines so as to simplify the view of the connected machines. As shown, the connected machines are visually grouped into connected subsets, two subsets 2114 are indicated as examples of visually distinct subsets of connected groups of machines. Connections are displayed at all levels of display, in some embodiments, while in other embodiments, connections are only shown at a certain level of zoom (or for a threshold number of machines or connections). Connections are not shown in displays 2110 and 2120 (of FIG. 21B) for clarity. The method of graphing the nodes (machines) includes, in some embodiments, generating hidden connections to generate visually compact groupings of connected nodes (as opposed to long chains of connected nodes).

Selection 2115 indicates an area selected for a zoom operation that results in display 2120 of FIG. 21B which displays the groupings in finer detail and enables a further zooming operation on selection area 2125. In some embodiments, a scrolling or dragging operation is also used to navigate in a zoomed-in view to display different areas of the generated graph. Methods of generating graphs in response to scrolling and dragging operations are described below. Display 2130 of FIG. 21C illustrates a zoomed-in view of the selection area 2125. At this level of zoom, individual machines are labeled with identifiers (e.g., names) and connections 2135 are shown that make the separate connected sets of machines more obvious and indicate specific connections between machines of the connected subset. Additional details of the machines including whether they have been added, been deleted, or moved during a time period selected for display are, in some embodiments, visually depicted by icons on the individual machine nodes such as icons 2140, 2145, and 2150, respectively. Each machine and connection depicted, in some embodiments, is available for selection and hover operations that provide additional information regarding the element.

Figure 22A:
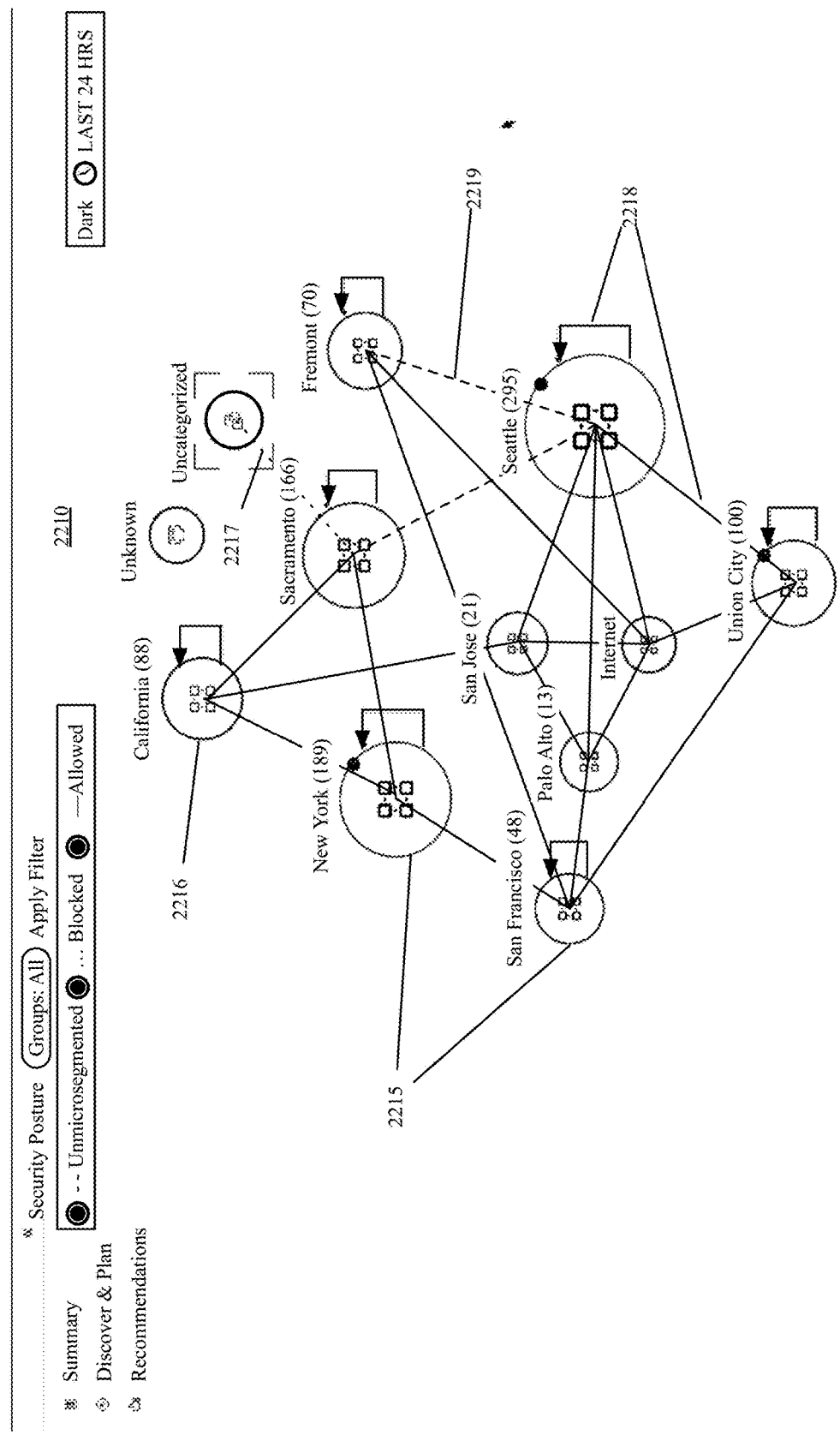
FIGS. 22A-B illustrate an embodiment of a group-based view and a drill down into a particular group for a machine-based view of the group and machines connected to the group.
Figure 22B:
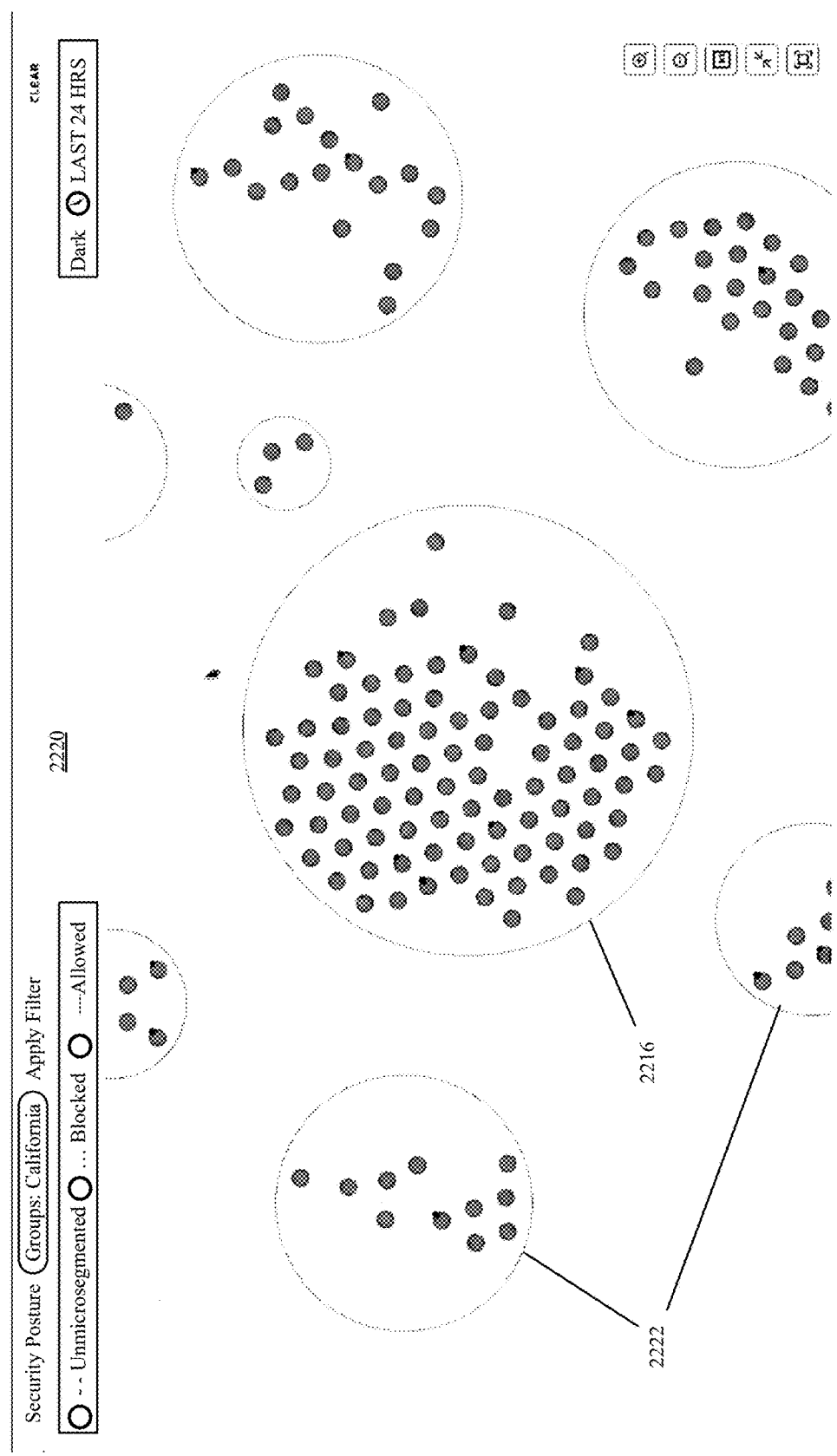

FIGS. 22A-B illustrate an embodiment of a group-based view and a drill down into a particular group for a machine-based view of the group and machines connected to the group. FIG. 22A illustrates a display 2210 of a group-based view of the network. The group-based view, in some embodiments, includes a set of groups 2215 that each include a set of machines. Connections between groups (e.g., connections between machines in the groups) are depicted by lines 2217-2219. In some embodiments, the different connections are identified as allowed (e.g., 2218), unmicrosegmented (e.g., 2219), or blocked (2217) based on the line style or line color. In some embodiments, one of either line style or color is used to visually represent additional details of the flows. Display 2210 presents each group, in some embodiments, as a selectable element for further visualization of the group that indicates the individual machines in the group.

FIG. 22B depicts one embodiment of a further visualization 2220 based on the selection of the group 2216. Visualization 2220 depicts group 2216 including all the machines in group 2216 (even those with no connections) and all the groups 2222 that include machines connected to machines in group 2216. In the embodiment depicted in FIG. 22B, for groups other than group 2216, only machines connected to machines in group 2216 are shown. In some embodiments, lines between connected machines are displayed. Each group, machine, and connection depicted, in some embodiments, is available for selection and hover operations that provide additional information regarding the element.

Figure 23:
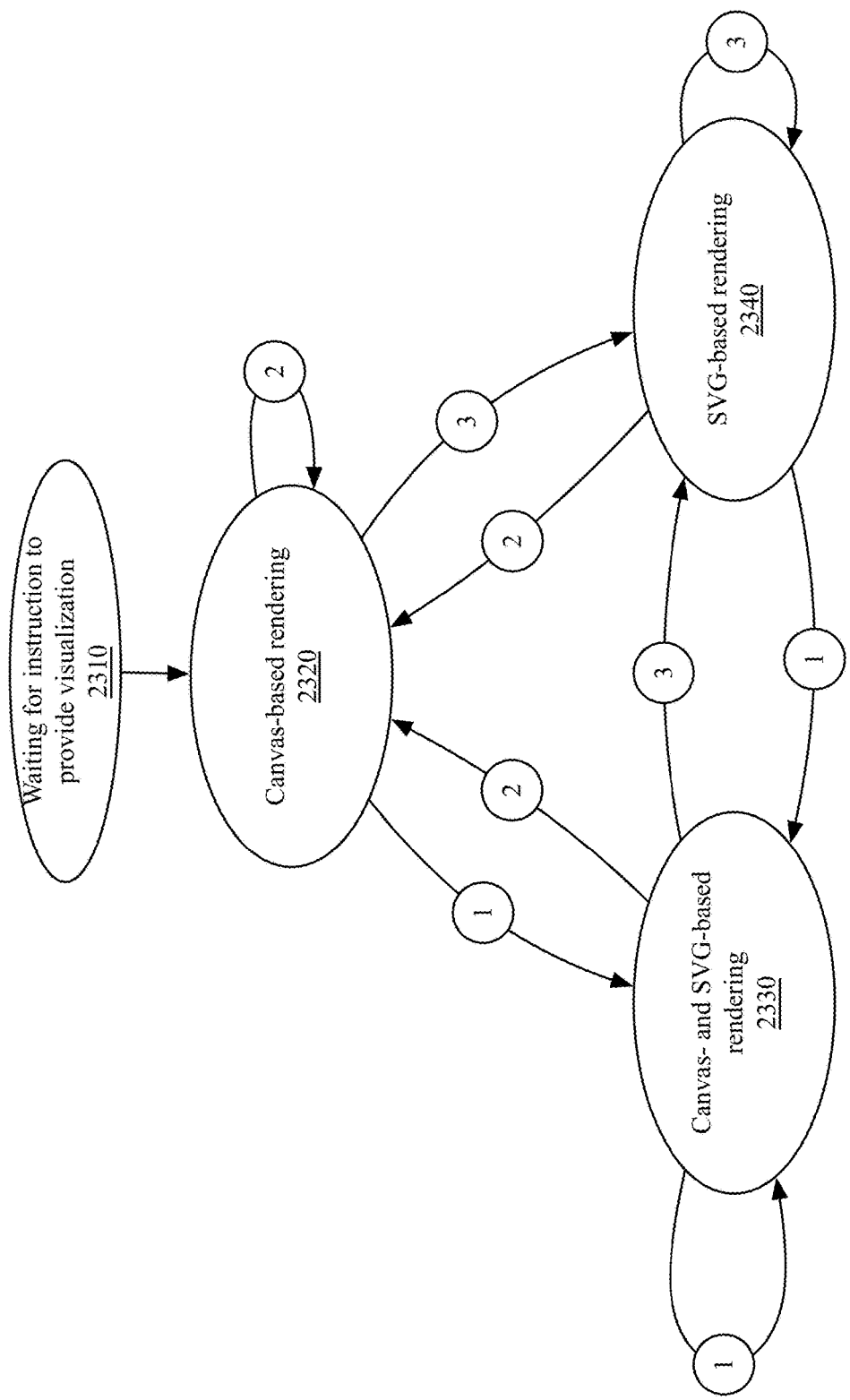
FIG. 23 illustrates a state diagram for a visualization engine producing different displays of any of the network visualizations of FIGS. 21 and 22.

FIG. 23 illustrates a state diagram for a visualization engine producing different displays of any of the network visualizations described above in relation to FIGS. 21 and 22. The state diagram starts at 2310, in some embodiments, in a waiting mode that waits for a command to provide a visualization (e.g., a selection of a virtualization tab in a user interface). After receiving an instruction to provide a visualization, the visualization engine transitions into a canvas-based rendering state 2320 in which it generates a canvas object (e.g., a bitmap) that includes all the selected entities (e.g., machines or groups) of the visualization. Transitions to other states, in some embodiments, are initiated by a user selecting a different viewing area. Selection "1" indicates a selection area for which the visualization engine transitions to state 2330 in which the visualization engine produces the display using a combination of canvas (e.g., bitmap) and scalable vector graphics (SVG) objects. For example, if a user selects a zoom function from an initial view of the whole network that results in less than 20 (or some other number identified as the threshold at which the alternative method of rendering becomes efficient) machines in the viewing area, the visualization engine renders the display using SVG objects to render the machines and canvas objects to render the connections between the machines. The transition is determined, in some embodiments, by the contents of the resulting display area and all selections resulting in a transition to a same state are labeled with the same number in FIG. 23.

A selection of a larger area (labeled as "2"), in some embodiments, causes the visualization engine to enter (or remain in) state 2320. In some embodiments, the size of the area of the original (full) graph that is considered large enough to transition to state 2320 is determined as a percentage of the graph area. In other embodiments, the determination to transition to state 2320 is based on a number of machines (nodes) and connections that are included in the selected display area. A selection of a sufficiently small area (labeled as "3"), in some embodiments, causes the visualization engine to transition to (or remain in) state 2340 in which the display is based on only SVG objects. In some embodiments, such a transition is caused when a selected viewing area results in the display of a set of unconnected nodes such that no canvas objects for connections are necessary.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
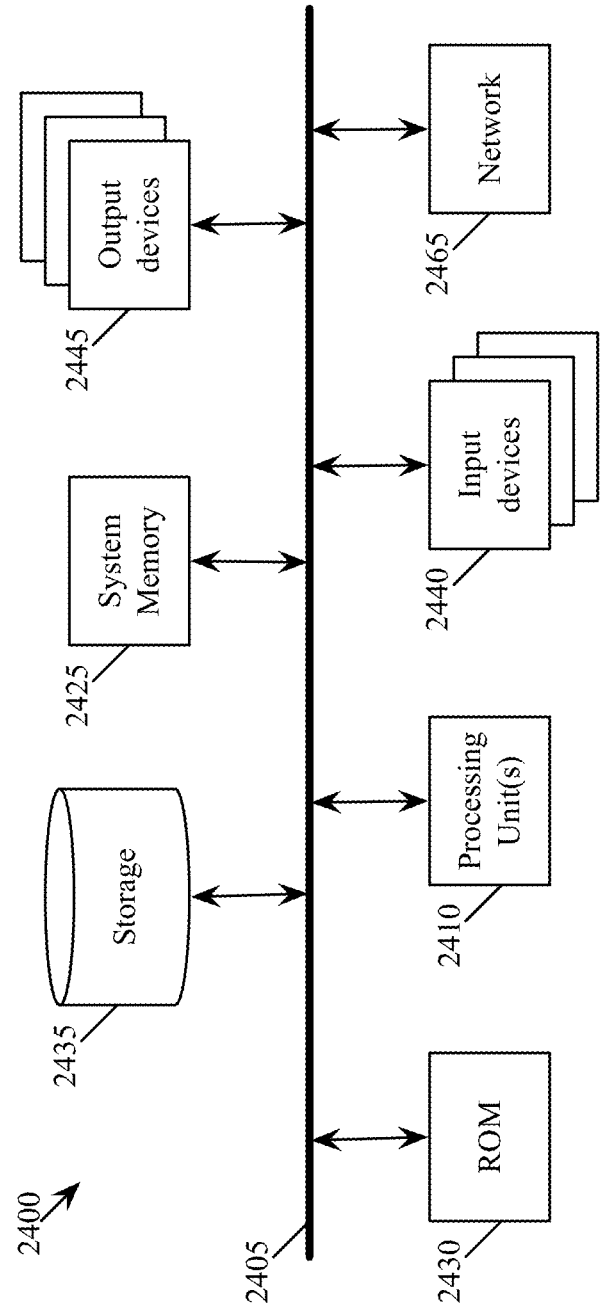
FIG. 24 conceptually illustrates a computer system with which some embodiments of the invention are implemented.

FIG. 24 conceptually illustrates a computer system 2400 with which some embodiments of the invention are implemented. The computer system 2400 can be used to implement any of the above-described hosts, controllers, and managers. As such, it can be used to execute any of the above described processes. This computer system includes various types of non-transitory machine readable media and interfaces for various other types of machine readable media. Computer system 2400 includes a bus 2405, processing unit(s) 2410, a system memory 2425, a read-only memory 2430, a permanent storage device 2435, input devices 2440, and output devices 2445.

The bus 2405 collectively represents all system, peripheral, and chipset buses that communicatively connect the numerous internal devices of the computer system 2400. For instance, the bus 2405 communicatively connects the processing unit(s) 2410 with the read-only memory 2430, the system memory 2425, and the permanent storage device 2435.

From these various memory units, the processing unit(s) 2410 retrieve instructions to execute and data to process in order to execute the processes of the invention. The processing unit(s) may be a single processor or a multi-core processor in different embodiments. The read-only-memory (ROM) 2430 stores static data and instructions that are needed by the processing unit(s) 2410 and other modules of the computer system. The permanent storage device 2435, on the other hand, is a read-and-write memory device. This device is a non-volatile memory unit that stores instructions and data even when the computer system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, etc.) as the permanent storage device. Like the permanent storage device 2435, the system memory 2425 is a read-and-write memory device. However, unlike storage device 2435, the system memory is a volatile read-and-write memory, such a random access memory. The system memory stores some of the instructions and data that the processor needs at runtime. In some embodiments, the invention's processes are stored in the system memory 2425, the permanent storage device 2435, and/or the read-only memory 2430. From these various memory units, the processing unit(s) 2410 retrieve instructions to execute and data to process in order to execute the processes of some embodiments.

The bus 2405 also connects to the input and output devices 2440 and 2445. The input devices enable the user to communicate information and select commands to the computer system. The input devices 2440 include alphanumeric keyboards and pointing devices (also called "cursor control devices"). The output devices 2445 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 24, bus 2405 also couples computer system 2400 to a network 2465 through a network adapter (not shown). In this manner, the computer can be a part of a network of computers (such as a local area network ("LAN"), a wide area network ("WAN"), or an Intranet, or a network of networks, such as the Internet. Any or all components of computer system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for collecting and reporting attributes of data flows associated with a set of one or more machines executing on a host computer, the method comprising:
   identifying, during each of a plurality of time periods, a plurality of individual flows associated with the set of machines;
   identifying, for each time period, a plurality of groups of one or more flows by using keys to associate individual flows into groups of flows, and storing attributes for each group based on attributes of each flow in the group; and
   providing, after the plurality of time periods, the set of attributes for each group identified in the plurality of time periods to a server for further analysis of the data flows identified,
   wherein a particular key specifies a set of attributes that are used to associate individual flows into groups of flows.

2. The method of claim 1, wherein each group of flows is identified by a different set of key values, a key value comprising a set of attribute values for each attribute in the set of attributes specified by an associated key.

3. The method of claim 1, wherein the particular key also specifies at least one condition that must be met for an attribute value of an individual flow in order for the individual flow to be grouped into a group of flows.

4. The method of claim 3, wherein the condition specifies at least one range of values for the attribute value.

5. The method of claim 1, wherein the particular key also specifies at least one condition that must not be met for an attribute value of an individual flow in order for the individual flow to be grouped into a group of flows.

6. The method of claim 5, wherein the condition specifies a plurality of attribute values, wherein individual flows comprising any of the specified plurality of attribute values are not grouped into any group of flows for the key.

7. The method of claim 1, wherein the particular key also specifies that a set of values for a particular attribute are considered equivalent when identifying, for an individual flow, a group of flows.

8. The method of claim 7, wherein the set of values is a first set of values and is specified by specifying a second set of values that are not in the first set.

9. The method of claim 1, wherein the particular key also specifies a set of collected attributes that are collected for each group of flows associated with the particular key.

10. The method of claim 9, wherein the particular key also specifies a manner of combining, for each attribute, attribute values in each individual flow into a set of attributes for the group of flows.

11. The method of claim 10, wherein for a particular attribute, attribute values are combined by identifying unique values for the attribute in the individual flows in the group of flows.

12. The method of claim 10, wherein for a particular attribute, attribute values are combined by concatenating attribute values for the attribute from individual flows in the group of flows.

13. The method of claim 10, wherein for a particular attribute, attribute values are combined by summing the attribute values for the attribute from each individual flow in the group of flows.

14. The method of claim 10, wherein for a particular attribute, attribute values are combined by keeping an extreme attribute value for the attribute from the individual flows in the group of flows.

15. The method of claim 9, wherein at least one of the set of attributes and the set of collected attributes is a contextual attribute for layers other than layers 2-7 of an open systems interconnection (OSI) model.

16. The method of claim 9, wherein at least one of the set of attributes and the set of collected attributes is a statistic related to the individual flows that is generated on the host.

17. A method for collecting and reporting attributes of data flows associated with a set of one or more machines executing on a host computer, the method comprising:
identifying, during each of a plurality of time periods, a plurality of individual flows associated with the set of machines;
identifying, for each time period, a plurality of groups of one or more flows by using keys to associate individual flows into groups of flows, and storing attributes for each group based on attributes of each flow in the group;
providing, after the plurality of time periods, the set of attributes for each group identified in the plurality of time periods to a server for further analysis of the data flows identified; and
dynamically generating, for at least one particular key, a plurality of key values each of which is associated with a group of one or more identified individual flows,
wherein the generated plurality of key values identifies a plurality of groups of flows, with each group identified by each generated key value comprising the set of individual flows associated with the generated key value.

18. A method for collecting and reporting attributes of data flows associated with a set of one or more machines executing on a host computer, the method comprising:
identifying, during each of a plurality of time periods, a plurality of individual flows associated with the set of machines;
identifying, for each time period, a plurality of groups of one or more flows by using keys to associate individual flows into groups of flows, and storing attributes for each group based on attributes of each flow in the group; and
providing, after the plurality of time periods, the set of attributes for each group identified in the plurality of time periods to a server for further analysis of the data flows identified,
wherein each key has at least one associated value that is shared by all the flows in at least one group that is identified by using the key.

19. The method of claim 18, wherein at least one associated value is provided to the host computer from another computer.

* * * * *